(12) United States Patent
Asano et al.

(10) Patent No.: US 8,412,715 B2
(45) Date of Patent: Apr. 2, 2013

(54) INFORMATION PROCESSING APPARATUS AND METHOD AND PROGRAM FOR CONTROLLING THE SAME

(75) Inventors: Yasuharu Asano, Kanagawa (JP); Keiichi Yamada, Tokyo (JP); Seiichi Aoyagi, Tokyo (JP); Kazumi Aoyama, Saitama (JP)

(73) Assignee: Sony Corporation, Tokyo (JP)

( * ) Notice: Subject to any disclaimer, the term of this patent is extended or adjusted under 35 U.S.C. 154(b) by 835 days.

(21) Appl. No.: 11/104,055

(22) Filed: Apr. 12, 2005

(65) Prior Publication Data

US 2005/0240413 A1 Oct. 27, 2005

(30) Foreign Application Priority Data

Apr. 14, 2004 (JP) ................ 2004-118644

(51) Int. Cl.
*G06F 7/00* (2006.01)
*G06F 17/30* (2006.01)
(52) U.S. Cl. ............... 707/748; 707/737; 707/758
(58) Field of Classification Search ............ 707/104.1, 707/713, 708, 771, 767, 737, 748, 758
See application file for complete search history.

(56) References Cited

U.S. PATENT DOCUMENTS

| | | | | |
|---|---|---|---|---|
| 5,359,695 A | * | 10/1994 | Ohora et al. | 704/235 |
| 5,577,165 A | * | 11/1996 | Takebayashi et al. | 704/275 |
| 5,991,721 A | * | 11/1999 | Asano et al. | 704/257 |
| 7,020,561 B1 | * | 3/2006 | McLoughlin et al. | 702/19 |
| 2003/0216905 A1 | * | 11/2003 | Chelba et al. | 704/9 |

FOREIGN PATENT DOCUMENTS

| | | |
|---|---|---|
| JP | 2001-22779 A | 1/2001 |
| JP | 2003-228575 A | 8/2003 |

OTHER PUBLICATIONS

Tsur, Oren, "Definitional Question-Answering Using Trainable Text Classifiers," Dec. 2003, Institute of Logic Language and Computation, University of Amsterdam, pp. 1-85.*
Green et al., "The Use of Theorem-Proving Techniques in Question-Answering Systems," 1968, ACM National Conference, pp. 169-181.*
White, Marilyn, "Analyzing Electronic Question/Answer Services: Introduction and Analytical Framework," 1999, pp. 1-75.*
Tsur'003 ("Definitional Question-Answering Using Trainable Text Classifiers," Dec. 2003, Institute of Logic Language and Computation, University of Amsterdam, pp. 1-85).*

* cited by examiner

*Primary Examiner* — Kimberly Wilson
*Assistant Examiner* — Hexing Liu
(74) *Attorney, Agent, or Firm* — Frommer Lawrence & Haug LLP; William S. Frommer

(57) ABSTRACT

An information processing apparatus for performing dialogue processing. The apparatus acquires text data described in a natural language and stores a plurality of examples each including an example statement and frame information described using a frame format and corresponding to the example statement. A similarity between the text data and the example statement is calculated. An example is selected corresponding to an example statement whose similarity to the text data is the highest from among the plurality of examples in accordance with the calculated similarity. Text data is converted into the frame format in accordance with the frame information corresponding to the example selected by the example selection. Dialogue processing is performed in accordance with the text data converted into the frame format.

12 Claims, 26 Drawing Sheets

FIG. 4

| Slot Name | Value |
|---|---|
| Date | |
| Place | |
| Weather | |
| Maximum Temperature | |
| Minimum Temperature | |
| Probability of Rain | |

FIG. 5

Top-left quadrant:

Tell me the weather for tomorrow in Tokyo
The weather forecast for tomorrow in Tokyo

| Slot Name | Value |
|---|---|
| Date | Tomorrow |
| Place | Tokyo |
| Weather | Target |

Top-right quadrant (upper):

The probability of rain for tomorrow in Tokyo
Will it rain tomorrow in Tokyo?
The probability of rain tomorrow
Will it rain tomorrow?

| Slot Name | Value |
|---|---|
| Date | Tomorrow |
| Place | Tokyo |
| Probability of rain | Target |

Bottom-left quadrant:

The temperature for tomorrow in Tokyo
Will it be warm tomorrow in Tokyo?

| Slot Name | Value |
|---|---|
| Date | Tomorrow |
| Place | Tokyo |
| Maximum Temperature | Target |
| Minimum Temperature | Target |

Bottom-right quadrant:

Tomorrow

| Slot Name | Value |
|---|---|
| Date | Tomorrow |

| Slot Name | Value |
|---|---|
| Date | Today |
| Place | Yokohama |
| Weather | Target |

| Slot Name | Value |
|---|---|
| Date | Tomorrow |
| Place | Tokyo |
| Weather | Target |

| Slot Name | Value |
|---|---|
| Date | Today |
| Place | Yokohama |
| Weather | Target |
| Maximum Temperature | |
| Minimum Temperature | |
| Probability of Rain | |

| Slot Name | Value |
|---|---|
| Date | Today |
| Place | Yokohama |
| Weather | Target |

FIG. 8

| Target | Template |
|---|---|
| Weather | The weather for $(date) in $(place) is $(weather). |
| Maximum Temperature | The maximum temperature for $(date) in $(place) is $(maximum temperature) degrees. |

FIG. 9

| Question | Template |
|---|---|
| Date | For which date do you want to know the weather? |
| Place | For which place do you want to know information? |

FIG. 10

| Slot Name | Value |
|---|---|
| Date | |
| Name of Television Station | |
| Category | |
| Name of Program | |
| Performer | |
| Time Period | |
| Start Time | |
| Ending Time | |
| Operation | |

FIG. 11

Tell me the soccer programs on this afternoon
What soccer programs are on this afternoon?

| Slot Name | Value |
|---|---|
| Date | Today |
| Category | Soccer |
| Name of Program | Target |
| Time Period | Afternoon |

What time does the live baseball broadcast start?
What time does the live baseball broadcast on Channel 8 start?

| Slot Name | Value |
|---|---|
| Name of Television Station | AA Broadcasting |
| Category | Baseball |
| Start Time | Target |

Record

| Slot Name | Value |
|---|---|
| Operation | Recording |

What drama does Masakazu Yamamura appear in?

| Slot Name | Value |
|---|---|
| Performer | Masakazu Yamamura |
| Category | Drama |
| Name of Program | Target |

Who is the guest on Hanako's Room today?

| Slot Name | Value |
|---|---|
| Date | Today |
| Name of Program | Hanako's Room |
| Performer | Target |

Tomorrow

| Slot Name | Value |
|---|---|
| Date | Tomorrow |

FIG. 14

| Target | Template |
|---|---|
| Name of Program | The program $(name of program) was found. |
| Performer | The performer in $(name of program) on $(date) is $(performer). |
| Number of Found Cases | $(Number of found cases) desired programs were found. |

FIG. 15

| Question | Template |
|---|---|
| Date | Which date are you interested in? |
| Category | Which category are you interested in? |
| Time Period | Which time period are you interested in? |

# INFORMATION PROCESSING APPARATUS AND METHOD AND PROGRAM FOR CONTROLLING THE SAME

CROSS REFERENCES TO RELATED APPLICATIONS

The present invention contains subject matter related to Japanese Patent Application JP 2004-118644 filed in the Japanese Patent Office on Apr. 14, 2004, the entire contents of which are incorporated herein by reference.

BACKGROUND OF THE INVENTION

1. Field of the Invention

The present invention relates to information processing apparatuses and methods and to programs for controlling the information processing apparatuses and methods, and more particularly, to an information processing apparatus and method suitable for performing dialogue processing on natural language text input by users and to a program for controlling such information processing apparatus and method.

2. Description of the Related Art

Representation in a frame format has been used for natural language dialogue processing. For example, as described in Japanese Unexamined Patent Application Publication No. 2001-22779, dialogue processing has been performed by extracting information necessary for representation in a frame format from text input by users using general natural language processing, such as syntax and semantic parsing, in dialogue processing apparatuses.

In addition, as described in Japanese Unexamined Patent Application Publication No. 2003-228575, a dialogue system capable of processing input text using examples, without using natural language processing based on general rules, such as grammar, is known. For example, in such a dialogue system, examples stored in advance in the system are searched for in accordance with characters input by a user, and the found examples are presented to the user. Then, the user selects a most suitable example from among the presented examples, so that the user can finally acquire a desired search result.

SUMMARY OF THE INVENTION

In known dialogue processing technologies based on natural language processing technologies, in order to parse input text, it is desirable to describe rules for symbol processing typified by grammar and to perform language processing in accordance with the rules. Thus, it is difficult to perform processing when expressions that are not assumed by grammar are input by users. In addition, if users input text using, for example, a speech recognition technology or a character recognition technology and it is assumed that the input text includes an error, it may be impossible to deal flexibly with the error in the input text. In particular, for semantic processing, it is difficult to describe generalized rules that can be applied to various topics. When a dialogue processing apparatus that can deal with a new topic is configured, it is desirable to describe a new rule appropriate for the topic and to perform language processing in accordance with the rule. However, technical knowledge about natural languages is used to describe rules, and it is difficult to configure a dialogue processing apparatus that can deal with a new topic.

For dialogue processing technologies using examples, users select, from among examples stored in advance, text to be input next. Thus, it may be impossible for users, for example, to input refinement conditions for external database searching in a desired order.

In addition, in such dialogue processing systems using examples, a plurality of options for next input is presented to users. The flexibility in selection by users increases in accordance with an increase in the number of options. However, if options are presented to users using a speech interface (in other words, options are output using speech), instead of being displayed on a screen, it is less convenient for users to understand options in accordance with the increase in the number of options.

Accordingly, although, in known dialogue processing technologies using examples, users can perform dialogue processing for selecting text to be input from among predetermined options in accordance with a scenario determined in advance by a system, it is difficult to establish a dialogue processing system that is similar to a case where users freely perform dialogue.

There is a need to process natural language text input by a user to generate an appropriate response and to control an apparatus.

According to an embodiment of the present invention, an information processing apparatus performing dialogue processing includes acquisition means for acquiring text data described in a natural language; example storage means for storing a plurality of examples each including an example statement and frame information described using a frame format and corresponding to the example statement; similarity calculation means for calculating a similarity between the text data acquired by the acquisition means and the example statement stored by the example storage means; example selection means for selecting an example corresponding to an example statement whose similarity to the text data acquired by the acquisition means is the highest from among the plurality of examples stored by the example storage means in accordance with the similarity calculated by the similarity calculation means; text data processing means for processing the text data acquired by the acquisition means to convert the text data into the frame format in accordance with the frame information corresponding to the example selected by the example selection means; and dialogue processing means for performing the dialogue processing in accordance with the text data processed and converted into the frame format by the text data processing means.

The acquisition means may include speech data acquisition means for acquiring speech data and speech processing means for analyzing the speech data acquired by the speech data acquisition means and outputting the text data corresponding to the speech data.

The speech processing means may also acquire a reliability of the text data corresponding to the speech data. The similarity calculation means may calculate the similarity also using the reliability.

The information processing apparatus may further include history storage means for storing a history of the dialogue processing performed by the dialogue processing means. The similarity calculation means may calculate the similarity also using the history stored by the history storage means.

The information processing apparatus may further include user information storage means for storing user information. The similarity calculation means may calculate the similarity also using the user information stored by the user information storage means.

The information processing apparatus may further include searching means for searching for information stored in a predetermined database. The dialogue processing means may control the searching means to perform search processing necessary for the dialogue processing in accordance with the text data processed and converted into the frame format by the text data processing means.

The searching means may generate a search formula and search for the information stored in the predetermined database in accordance with the text data processed and converted into the frame format by the text data processing means.

The information processing apparatus may further include statement generation means for generating a statement to be reported to a user. The dialogue processing means may control the statement generation means to generate the statement necessary for the dialogue processing to be reported to the user in accordance with the text data processed and converted into the frame format by the text data processing means.

The statement generation means may store a template in advance, on which the statement is based.

The information processing apparatus may further include control signal generation means for generating a control signal for controlling an operation of an external apparatus connected via a network. The dialogue processing means may control the control signal generation means to generate the control signal for controlling the operation of the external apparatus connected via the network as a result of the dialogue processing in accordance with the text data processed and converted into the frame format by the text data processing means.

According to an embodiment of the present invention, an information processing method includes the steps of controlling acquisition of text data described in a natural language; calculating a similarity between the text data, the acquisition of which is controlled by the acquisition controlling step, and each of a plurality of examples each including an example statement and frame information described using a frame format and corresponding to the example statement, the plurality of examples being stored in a predetermined storage unit; selecting an example corresponding to an example statement whose similarity to the text data, the acquisition of which is controlled by the acquisition controlling step, is the highest from among the plurality of examples stored in the predetermined storage unit in accordance with the similarity calculated by the calculating step; processing the text data, the acquisition of which is controlled by the acquisition controlling step, to convert the text data into the frame format in accordance with the frame information corresponding to the example selected by the selecting step; and controlling the dialogue processing in accordance with the text data processed and converted into the frame format by the processing step.

According to an embodiment of the present invention, a program causes a computer to perform processing including the steps of controlling acquisition of text data described in a natural language; calculating a similarity between the text data, the acquisition of which is controlled by the acquisition controlling step, and each of a plurality of examples each including an example statement and frame information described using a frame format and corresponding to the example statement, the plurality of examples being stored in a predetermined storage unit; selecting an example corresponding to an example statement whose similarity to the text data, the acquisition of which is controlled by the acquisition controlling step, is the highest from among the plurality of examples stored in the predetermined storage unit in accordance with the similarity calculated by the calculating step; processing the text data, the acquisition of which is controlled by the acquisition controlling step, to convert the text data into the frame format in accordance with the frame information corresponding to the example selected by the selecting step; and controlling the dialogue processing in accordance with the text data processed and converted into the frame format by the processing step.

In an information processing apparatus, an information processing method, and a program for controlling the information processing apparatus and method, text data described in natural language is acquired, a plurality of examples each including an example statement and frame information described using a frame format and corresponding to the example statement is stored, the similarity between the example statement and the text data is calculated, an example corresponding to an example statement whose similarity to the text data is selected from the plurality of examples in accordance with the selected similarity, the text data is converted into the frame format in accordance with the frame information corresponding to the selected example, and dialogue processing is performed in accordance with the text data converted into the frame format.

Accordingly, dialogue processing is performed. In particular, the similarity between input text data and an example including an example statement and frame information described in a frame format and corresponding to the example statement is calculated, an example corresponding to the example statement is selected, the input text data is converted into the frame format, and dialogue processing is performed. Thus, text input in natural language by a user can be processed, and generation of an appropriate response and control of an apparatus can be achieved. Furthermore, addition, change, or deletion of examples can be performed easily.

BRIEF DESCRIPTION OF THE DRAWINGS

FIG. 4 is an illustration for explaining the frame structure in a first example of dialogue processing;

FIG. 5 is an illustration for explaining examples stored in an example database shown in FIG. 2 in the first example of the dialogue processing;

FIG. 8 is an illustration for explaining an example of templates of an output statement presented to a user in the first example of the dialogue processing;

FIG. 9 is an illustration for explaining an example of templates when a question is output to the user as an output statement in the first example of the dialogue processing;

FIG. 10 is an illustration for explaining the frame structure in a second example of dialogue processing;

FIG. 11 is an illustration for explaining examples stored in the example database shown in FIG. 2 in the second example of the dialogue processing;

FIG. 14 is an illustration for explaining an example of templates of an output statement presented to the user in the second example of the dialogue processing;

FIG. 15 is an illustration for explaining an example of templates when a question is output to the user as an output statement in the second example of the dialogue processing;

DESCRIPTION OF THE PREFERRED EMBODIMENTS

Embodiments of the present invention will be described with reference to the drawings.

Figure 1:
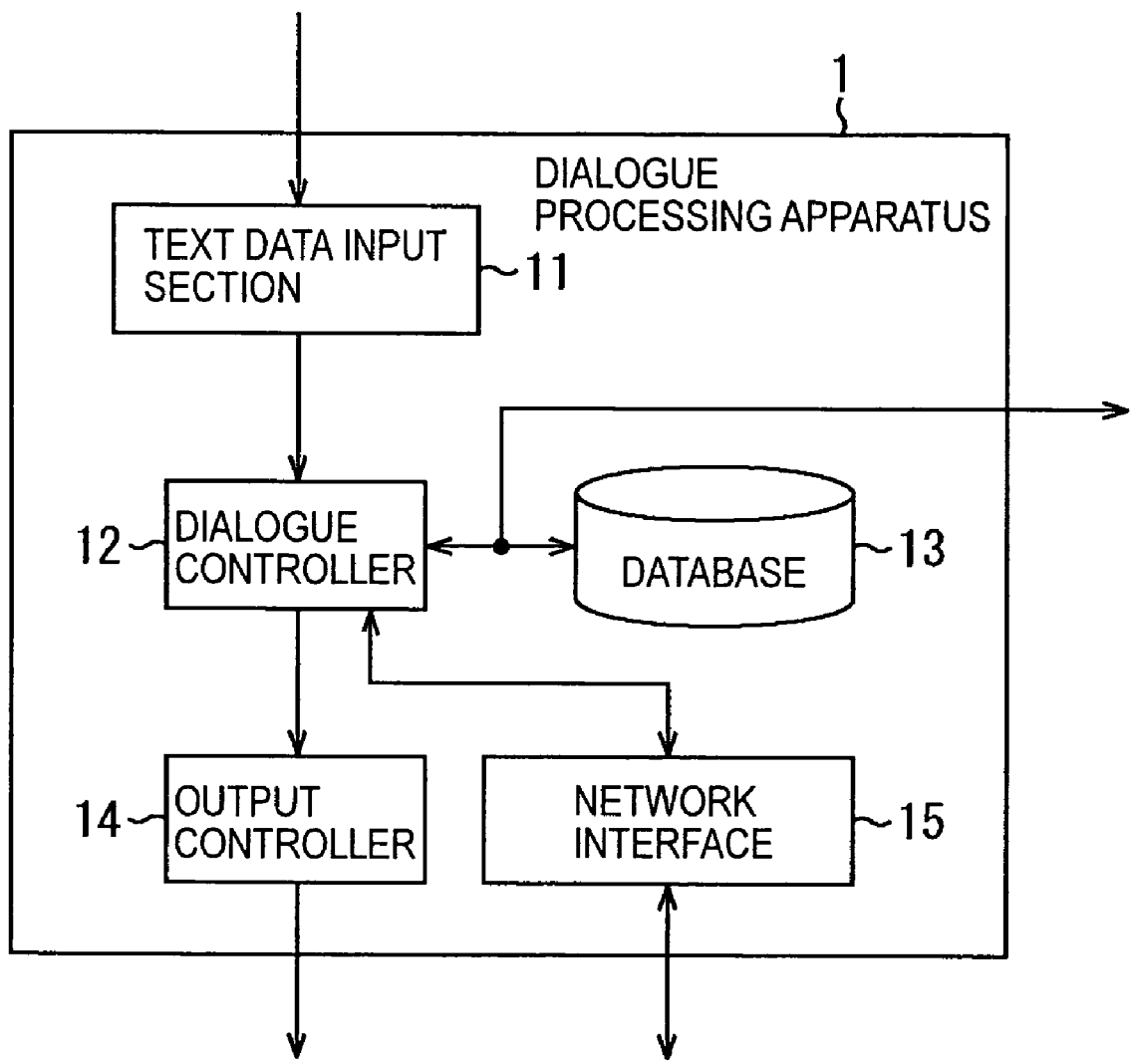
FIG. 1 is a block diagram showing the structure of a dialogue processing apparatus according to an embodiment of the present invention.

FIG. 1 is a block diagram showing the structure of a dialogue processing apparatus 1 according to a first embodiment of the present invention.

A text data input section 11 acquires text data input by a user using, for example, a keyboard or a touch pad, and outputs the acquired text data to a dialogue controller 12.

The dialogue controller 12 performs dialogue processing in accordance with the text data supplied from the text data input section 11. The dialogue controller 12 also accesses a database 13 or an external database to acquire information desired by the user. The dialogue controller 12 also generates an output statement corresponding to an answer to a user's query or corresponding to a notice for urging the user to input information necessary for acquiring an answer, and supplies the generated output statement to an output controller 14. The dialogue controller 12 also generates a control signal for controlling an external apparatus, and outputs the generated control signal to the corresponding apparatus via a network interface 15.

The database 13 stores therein data necessary for dialogue processing. If the dialogue processing apparatus 1 is capable of being connected to an external database, the database 13 need not be provided.

The output controller 14 includes, for example, a display unit capable of displaying text and image information and a display control unit for controlling the display unit. Alternatively, the output controller 14 includes, for example, a speaker outputting speech and a speech processing unit for processing speech data output from the speaker. The output controller 14 displays or outputs, using speech, the output statement generated by the dialogue controller 12. In addition, the output controller 14 may output image data or speech data to an external display unit or an external speaker.

The network interface 15 is connected to a network, such as a local-area network (LAN), a home network, or the Internet. The network interface 15 outputs the control signal generated by the dialogue controller 12 to a network-compatible apparatus, such as display apparatus, a speaker, a television receiver, a video cassette recorder, or a home server via the network, and receives an answer signal corresponding to the control signal from the apparatus to which the control signal is output.

Figure 2:
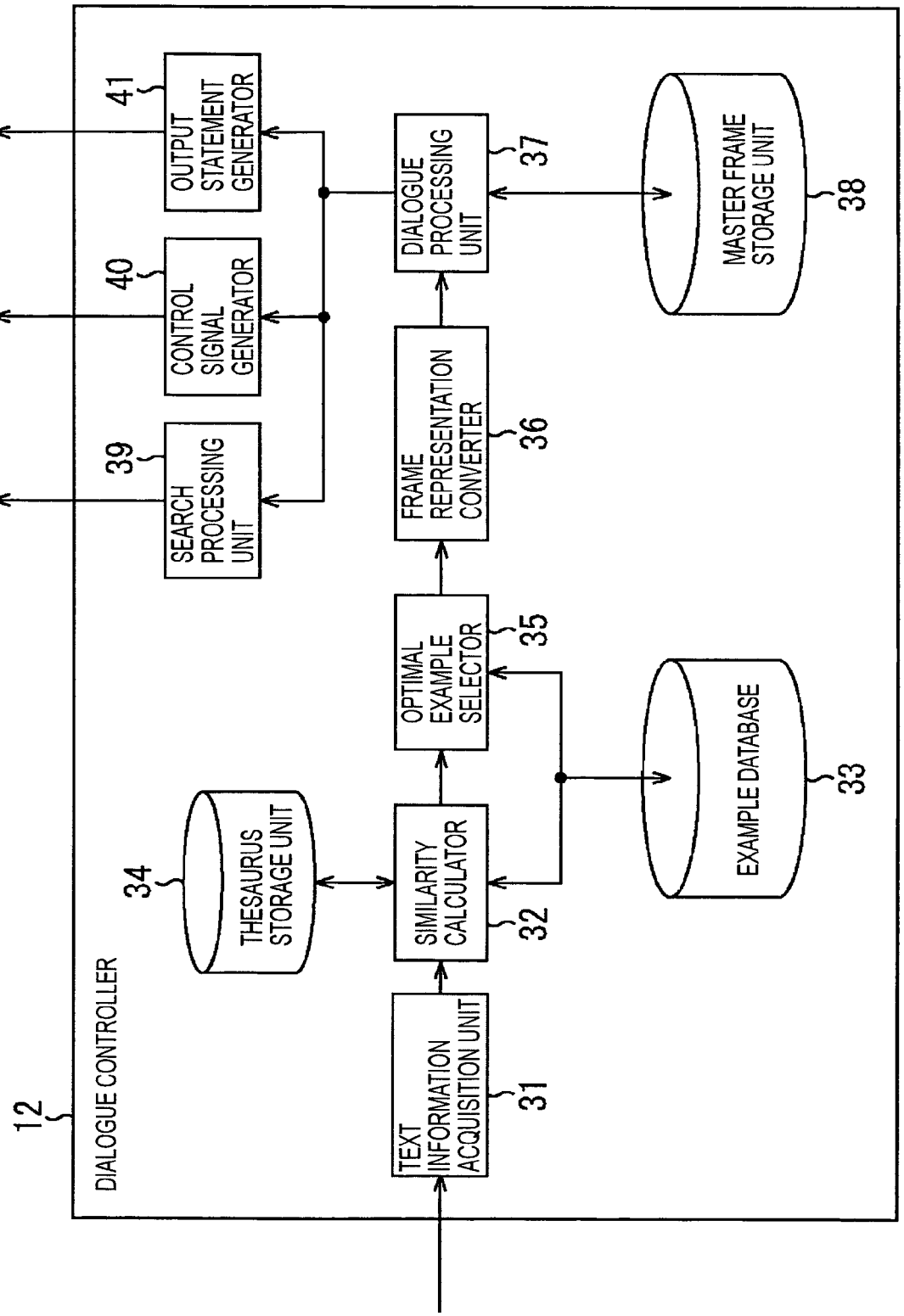
FIG. 2 is a block diagram showing the structure of a dialogue controller shown in FIG. 1.

FIG. 2 is a block diagram showing the detailed structure of the dialogue controller 12 shown in FIG. 1.

A text information acquisition unit 31 acquires text information (for example, text data supplied from the text data input section 11) input by the user, and supplies the acquired text information to a similarity calculator 32.

The similarity calculator 32, for example, divides the text information supplied from the text information acquisition unit 31 in units of words, and converts the text information into a word string constituted only by independent words by eliminating particles or the like. The similarity calculator 32 calculates a similarity score representing the similarity between the word string (hereinafter, referred to as an input word string, if necessary) and each example statement stored in an example database 33 using a thesaurus stored in a thesaurus storage unit 34, and supplies the calculation result to an optimal example selector 35.

A plurality of examples is stored (or registered) in the example database 33. Each example includes at least one example statement generated in accordance with a field for which dialogue processing is performed and a group of slots (frame information) representing the example statement in a frame format. Examples stored in the example database 33 will be described below with reference to FIG. 5 or FIG. 11. A thesaurus used by the similarity calculator 32 to calculate the similarity between an input word string and each example statement stored in the example database 33 is stored in the thesaurus storage unit 34. In a thesaurus, each word is represented by a hierarchical tree structure based on the word concept. The thesaurus will be described below with reference to FIG. 3.

The optimal example selector 35 selects an example corresponding to the example statement whose similarity is the highest (hereinafter, the selected example is referred to as an optimal example) from the example database 33 in accordance with the similarity score supplied from the similarity calculator 32, and outputs the optimal example and the input word string to a frame representation converter 36.

The frame representation converter 36 replaces values in the group of slots for the selected optimal example by words constituting the input word string, and outputs the replaced group of slots to a dialogue processing unit 37.

A master frame storage unit 38 stores therein a master frame for determining the operation performed by the dialogue processing unit 37. The master frame stored in the master frame storage unit 38 differs depending on the field of dialogue for which the dialogue controller 12 performs processing. A specific example of the master frame will be described below with reference to FIG. 4 or FIG. 10.

The dialogue processing unit 37 updates the master frame stored in the master frame storage unit 38 in accordance with the group of slots supplied from the frame representation converter 36, and determines which operation is to be performed next as dialogue processing in accordance with the state of the updated master frame. In other words, in dialogue processing, on the basis of the updated master frame, the dialogue processing unit 37 selects an operation from among accessing the database 13 or the external database to acquire information on a slot designated as a "target" representing an answer to a user's query, generating and outputting a control signal to a predetermined external apparatus, and outputting text or speech using a predetermined template to report to the user a question for search refinement or information acquired by accessing the database, and controls a search processing unit 39, a control signal generator 40, and an output statement generator 41 to perform corresponding processing. In addition, the dialogue processing unit 37 further updates the master frame in accordance with the search result supplied from the search processing unit 39, and determines which operation is to be performed next as dialogue processing in accordance with the state of the updated master frame.

The search processing unit 39 accesses the database 13 or the external database under the control of the dialogue processing unit 37, acquires information on a slot designated as a target using a value described in another slot as a search key, and supplies the acquired information to the dialogue processing unit 37.

The control signal generator 40 generates, under the control of the dialogue processing unit 37, a control signal for a display apparatus or a speaker connected via a network or an external network-compatible apparatus, such as a television receiver, a video cassette recorder, or a home server, and outputs the generated control signal via the network interface 15.

The output statement generator 41 generates, by referring to a template stored therein, an output statement to report to the user a question for search refinement or information acquired by accessing the database, and supplies the generated output statement to the output controller 14 to be displayed as text data or to be output using speech, under the control of the dialogue processing unit 37. The template used for generating an output statement will be described below with reference to FIGS. 8 and 9 or FIGS. 14 and 15.

As described above, in dialogue processing according to the first embodiment, examples are stored in advance in association with representation in a frame format. An example corresponding to an example statement whose similarity to text input by a user is the highest is selected, and values in slots are replaced by words constituting an input word string, in other words, the input word string is associated with representation in the frame format. Thus, in calculation of similarity and search processing to acquire information by accessing a database, in order to extract a word as a search key, there is no need to re-extract the word from the input text or to perform semantic parsing of the word. In addition, in the dialogue processing according to the first embodiment, since the text input by the user is associated with representation in the frame format, a word to be put in a template can be easily determined when output text is generated. In other words, an operation of dialogue processing can be simplified by the use of the frame format for dialogue processing using examples.

For example, as described in Japanese Unexamined Patent Application Publication No. 3-276367, a thesaurus having a hierarchical tree structure based on the semantic similarity (concept) of each word is used for calculation of the similarity between each example statement and an input word string performed by the similarity calculator 32. In other words, when both a word that constitute the input word string and a word that correspond to the word constituting the input word string and that constitute an example statement belong to the same category and the conceptual hierarchical level is the k-th level, the word similarity representing the conceptual similarity between the words is represented by (k−1)/n, where n represents the number of hierarchical levels of the thesaurus. The word similarities between words constituting the input word string and words constituting the example statement are obtained and integrated with each other. Then, the integration result is used as the similarity between the input word string and the example statement.

Figure 3:
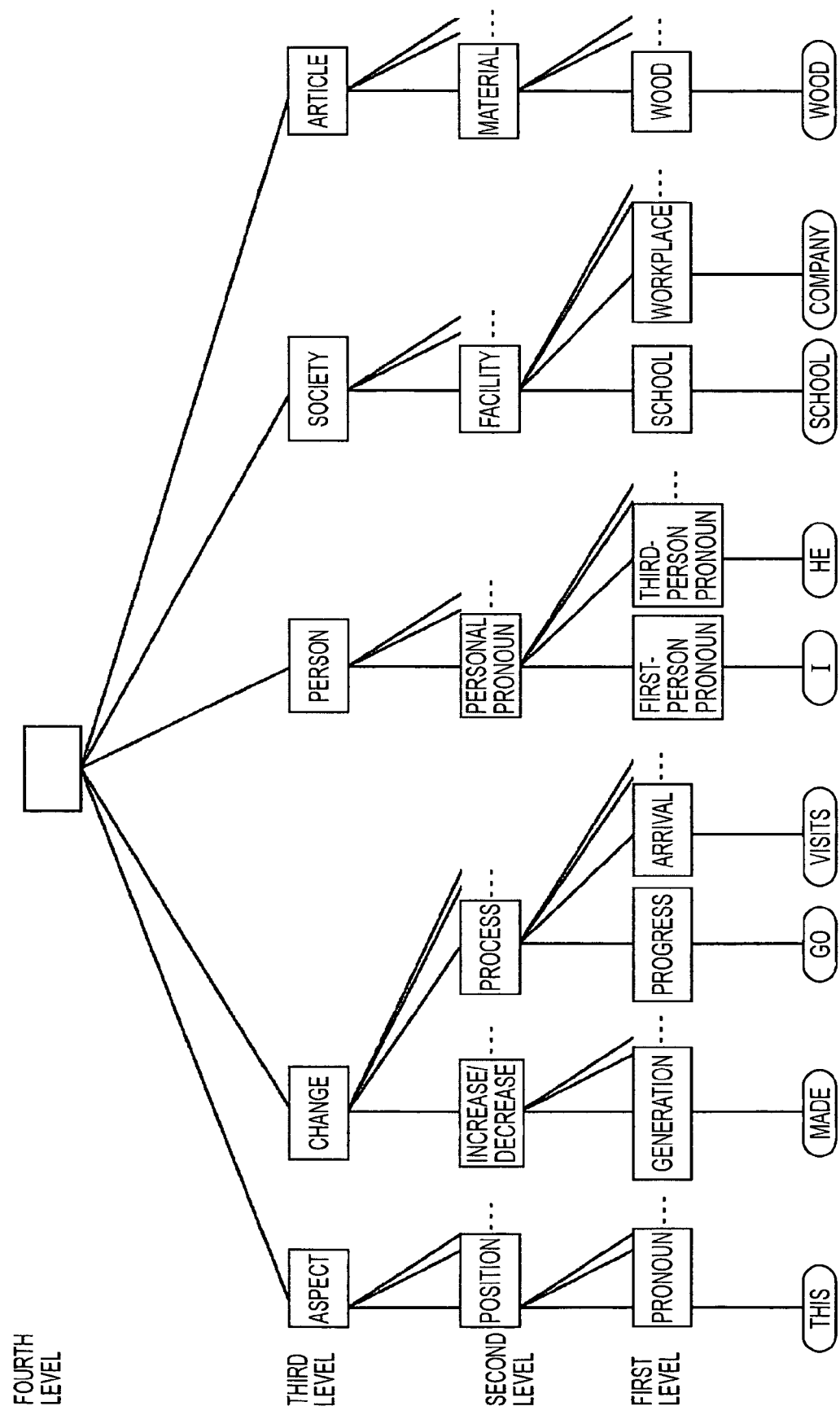
FIG. 3 is an illustration for explaining a thesaurus.

A method for calculating similarity when a thesaurus shown in FIG. 3 is stored in the thesaurus storage unit 34 is described next.

In FIG. 3, characters encircled by a rectangle represent concepts and characters encircled by an ellipse represent words. A concept belonging to the highest level of the hierarchy (the fourth level) is categorized into concepts, "aspect", "change", "person", "society", "article", and so on. For example, the concept "change" is categorized into concepts, "increase/decrease", "process", and so on. For example, the concept "process" is categorized into concepts, "progress", "arrival", and so on. For example, the word "visits" and other words belong to the concept "arrival".

In FIG. 3, the lowest conceptual level of the hierarchy is the first level, the second-lowest conceptual level of the hierarchy is the second level, the third-lowest conceptual level of the hierarchy is the third level, and the highest conceptual level of the hierarchy is the fourth level. The thesaurus shown in FIG. 3 has four-level concepts. Thus, the word similarity between words whose concepts are equal to each other at the first level of the thesaurus is 0, which is obtained by the condition (1−1)/4=0. The word similarity between words whose concepts are equal to each other at the second level of the thesaurus is ¼, which is obtained by the condition (2−1)/4=¼. Similarly, the word similarity between words whose concepts are equal to each other at the third level of the thesaurus is ½, and the word similarity between words whose concepts are equal to each other at the fourth level of the thesaurus is ¾.

For example, input text "I go to school" is output from the text information acquisition unit 31 to the similarity calculator 32. When the input text is divided by particles and converted into an input word string ("I", "school", and "go"), the similarity between the input word string ("I", "school", and "go") and an example statement "He visits a company" stored in the example database 33 is calculated as described below.

First, the word similarities between the words "I", "school", and "go" constituting the input word string ("I", "school", and "go") and the words "he", "company", and "visits" corresponding to the words "I", "school", and "go" and constituting the example statement "He visits a company" are calculated, respectively.

Since the words "I" and "he" have the same concept "personal pronoun" at the second level of the hierarchy, the word similarity d("I","he") is ¼, where d("X","Y") represents the word similarity between words "X" and "Y". Since the words "school" and "company" have the same concept "facility" at the second level of the hierarchy, the word similarity d("school","company") is ¼. Since the words "go" and "visits" have the same concept "process" at the second level of the hierarchy, the word similarity d("go","visits") is ¼.

The foregoing word similarities are integrated with each other. As a result, the integrated value ¾ is obtained by the condition ¼+¼+¼=¾. The value ¾ is the similarity between the input word string ("I", "school", and "go") and the example statement "He visits a company".

The similarity between the input word string ("I", "school", and "go") and an example statement "This is made of wood" is calculated as described below.

When the word similarities between the words "I", "school", and "go" constituting the input word string ("I", "school", and "go") and the words "this", "wood", and "is made" corresponding to the words "I", "school", and "go" and constituting the example statement "This is made of wood" are calculated, respectively. Here, "is made" is regarded as "made". The word similarities d("I","this"), d("school","wood"), and d("go", "made") are calculated as 3/4, 3/4, and 2/4, respectively, in accordance with the thesaurus as described above. As a result, the similarity between the input word string ("I", "school", and "go") and the example statement "This is made of wood" is 8/4, which is obtained by the condition 3/4+3/4+2/4=8/4.

Although a method for calculating similarity using a thesaurus having a hierarchical tree structure has been described, other methods for calculating similarity can be used by the similarity calculator 32. For example, a method for calculating similarity using conceptual vector representation is described next.

When the word "I" in the input word string ("I", "school", and "go") is focused on, a list of concepts of the word "I" is ("first-person pronoun", "personal pronoun", and "person"). When the word "he" in the word string ("he", "company", and "visits") constituting the example statement is focused on, a list of concepts of the word "he" is ("third-person pronoun", "personal pronoun", and "person"). The lists of concepts of the words "I" and "he" are combined, and a conceptual list ("first-person pronoun","third-person pronoun", "personal pronoun", and "person") is obtained. When "1" is allocated to a corresponding concept element and "0" is allocated to a non-corresponding concept element, the conceptual list of the word "I" is described as (1,0,1,1) and the conceptual list of the word "he" is described as (0,1,1,1). Accordingly, the conceptual list of each word can be re-written in vector representation.

The similarity between two vectors (a,b) is represented by the condition $\cos \theta = (a \cdot b)/(|a| \times |b|)$ using a cosine ($\cos \theta$), where $\theta$ represents the angle between the two vectors. Thus, the similarity between the words "I" and "he" is 2/3=0.67.

Similarly, the similarities between the words "school" and "company" and between the words "go" and "visits" are calculated. In this case, both the similarities are 0.67.

When the similarity between the input word string and the word string constituting the example statement is obtained by calculating the similarities between the respective words by the method for calculating similarity using conceptual vector representation, as described above, and by averaging the calculated similarities, the similarity between the input word string ("I", "school", and "go") and the word string ("he", "company", and "visits") constituting the example statement is 0.67, which is obtained by the condition (0.67+0.67+0.67)/3=0.67.

In addition, the similarity between the input word string ("I", "school", and "go") and the word string ("this", "wood", and "made") constituting another example statement is 0.11, which is obtained by similar calculation.

The foregoing specific example of a method for calculating similarity using conceptual vector representation adopts concepts constituting a thesaurus having a hierarchical tree structure. The method for calculating similarity using conceptual vector representation need not adopt such a thesaurus, however. For example, the relationship between a "vocabulary entry" and a "word in description" in dictionaries may be used for the method for calculating similarity using conceptual vector representation. In this case, the "vocabulary entry" is regarded as a word, and the "word in description" is used as a word concept.

In addition, a calculation method using an expanded string kernel described in a document "String Kernel with Feature Selection Function" in Technical Report of The Institute of Electronics, Information and Communication Engineers (IE-ICE) 2003-NL-157 may be used as another method for calculating similarity performed by the similarity calculator 32.

Accordingly, the similarity between an input word string and each example statement registered in the example database 33 is calculated.

Example statements and frame representation used in the dialogue controller 12 will be described with reference to FIGS. 4 to 15.

First, example statements and frame representation when dialogue processing for weather forecasting is performed are described with reference to FIGS. 4 to 9.

FIG. 4 shows an example of frame representation used by the dialogue controller 12 when dialogue processing for weather forecasting is performed. A frame includes one or more slots. Each slot includes a slot name and a value corresponding to the slot name. The frame shown in FIG. 4 used for processing for weather forecasting includes slot names, "date", "place", "weather", "maximum temperature", "minimum temperature", and "probability of rain". Such a frame is stored as a master frame in the master frame storage unit 38, and values are updated in accordance with processing by the dialogue processing unit 37. Updating of the master frame will be described below with reference to FIG. 7.

When the frame representation described in FIG. 4 is used as a master frame, for example, examples shown in FIG. 5 are stored in the example database 33.

Each example stored in the example database 33 includes one or more example statements and a group of slots representing the semantic contents of the example statements. For example, example statements "Tell me the weather for tomorrow in Tokyo" and "The weather forecast for tomorrow in Tokyo" and a group of slots composed of three slots constitute an example. In the slots, values for the slot names "date" and "place" are defined by "tomorrow" and "Tokyo", respectively, and a value for the slot name "weather" is set as a target, which is information desired by a user. Example statements "The temperature for tomorrow in Tokyo" and "Will it be warm tomorrow in Tokyo?" and a group of slots composed of four slots constitute an example. In the slots, values for the slot names "date" and "place" are defined by "tomorrow" and "Tokyo", respectively, and each value for the slot names "maximum temperature" and "minimum temperature" is set as a target, which is information desired by the user. Example statements "The probability of rain for tomorrow in Tokyo", "Will it rain tomorrow in Tokyo?", "The probability of rain tomorrow", and "Will it rain tomorrow?" and a group of slots composed of three slots constitute an example. In the slots, values for the slot names "date" and "place" are defined by "tomorrow" and "Tokyo", respectively, and a value for the slot name "probability of rain" is set as a target, which is information desired by the user. An example statement "Tomorrow" and a slot in which a value for the slot name "date" is defined by "tomorrow" constitute an example. This example statement is used, for example, for an answer to a system, which is given by the user in response to a question by the system in the process of dialogue.

Accordingly, a pair of one or more example statements and a group of slots representing the semantic contents of the example statements is described in each example. In other words, if a plurality of example statements is stored in an example, the same group of slots is capable of representing the semantic contents of the plurality of example statements. In addition, text input by users is associated with representation in a frame format, and this is convenient for calculation of similarity, search processing for acquiring information by accessing a database, or generation of an output statement, as described above.

In FIG. 5, in the example including the example statements "The probability of rain for tomorrow in Tokyo", "Will it rain tomorrow in Tokyo?", "The probability of rain tomorrow", and "Will it rain tomorrow?" and the corresponding group of slots, example statements including "Tokyo", which is information corresponding to the slot name "place", and example statements not including "Tokyo" are associated with the same group of slots. For example, since input text "Will it rain today?" has nothing corresponding to the slot name "place", a blank is provided as the value for the slot name "place". (In other words, by processing described below, a master frame does not reflect this.) Accordingly, since example statements having different numbers of corresponding slots can be included in the same example, the number of registered examples can be further reduced. Thus, the example database can be efficiently established.

In addition, in order to perform similarity calculation, which will be described below, for example, an example statement divided in units of words, such as "tomorrow, Tokyo, and rain", in advance by morphological analysis or the like may be stored as an example.

As described with reference to FIG. 5, each example is not selected to be input next by users and is irrespective of grammar rules. Thus, since examples can be added with disregard to a scenario of dialogue processing and complicated elements, such as grammar rules, the number of examples can be easily increased. In addition, in order to improve the search accuracy, examples can be deleted or changed easily if necessary.

The similarity calculator 32 calculates the similarity between an input word string and each of the examples shown in FIG. 5. In other words, in the similarity calculator 32, the input text and an example statement constituting each example are analyzed morphologically and divided in units of words. As a result, for example, input text "The, weather, for, today, in, Yokohama" is divided into six words, and an example statement "Tell, me, the, weather, for, tomorrow, in, Tokyo" is divided into eight words.

By calculation using the foregoing thesaurus, the similarity score between the input word string ("Yokohama", "today", and "weather") and the example statement "Tell me the weather for tomorrow in Tokyo" is, for example, ¾. Similarly, the similarity scores between the input word string and other example statements are calculated. In the first embodiment, high similarity is achieved when the value of the similarity score is small. This is because the thesaurus shown in FIG. 3 is arranged such that the lowest conceptual level constituting the thesaurus is the first level. If, on the contrary, a thesaurus arranged such that the highest conceptual level constituting the thesaurus is the first level is used, high similarity is achieved when the value of the similarity score is large. The similarity calculator 32 outputs the calculated similarity score to the optimal example selector 35.

Then, the optimal example selector 35 selects an example corresponding to the example statement with the highest similarity, and supplies the selected example, that is, the optimal example, and the input word string to the frame representation converter 36. For example, when text "The weather for today in Yokohama" is input, an example corresponding to the example statement "Tell me the weather for tomorrow in Tokyo" is selected as the optimal example, and three pairs of words (Yokohama, Tokyo), (today, tomorrow), and (weather, weather) are acquired. Thus, the optimal example selector 35 outputs the example corresponding to the example statement "Tell me the weather for tomorrow in Tokyo" and the input word string ("Yokohama", "today", and "weather") to the frame representation converter 36.

The frame representation converter 36 replaces words in a group of slots for the optimal example by the corresponding words constituting the input word string to acquire a frame format corresponding to the input text, and outputs information (the group of slots) representing the frame format to the dialogue processing unit 37.

Figure 6:
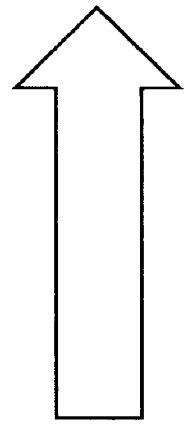
FIG. 6 is an illustration for explaining processing in a frame representation converter shown in FIG. 2 in the first example of the dialogue processing.

In other words, the frame representation converter 36 replaces the values in the group of slots for the selected optimal example corresponding to the example statement "Tell me the weather for tomorrow in Tokyo" by the words constituting the input word string ("Yokohama", "today", and "weather"), as shown in FIG. 6. As a result, the frame representation converter 36 outputs the group of slots in which the value "today" is described for the slot name "date", the value "Yokohama" is described for the slot name "place", and the value "target" is described for the slot name "weather" to the dialogue processing unit 37.

For example, if the text "The weather in Yokohama" is input, a pair of words for the slot name "date" is not acquired. Thus, a group of slots in which a blank is provided as the value of the slot name "date" is acquired as a frame format corresponding to the input text, and the group of slots is output to the dialogue processing unit 37.

Figure 7:
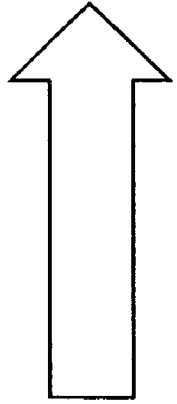
FIG. 7 is an illustration for explaining updating of a master frame in the first example of the dialogue processing.

The dialogue processing unit 37 receives information in the frame format corresponding to the input text, which is generated by the processing of the frame representation converter 36, and updates the master frame, which is described in FIG. 4, stored in the master frame storage unit 38, as shown in FIG. 7. In other words, the dialogue processing unit 37 sets the value for a slot name that is described in a frame format corresponding to the input text as the value for the same slot name in the master frame. More specifically, if the text "The weather for today in Yokohama" is input, the master frame described in FIG. 4 is updated such that the value "today" is described for the slot name "date", the value "Yokohama" is described for the slot name "place", and the value "target" is described for the slot name "weather". If the text "The weather in Yokohama" is input, the master frame described in FIG. 4 is updated such that the value "Yokohama" is described for the slot name "place" and the value "target" is described for the slot name "weather".

Then, the dialogue processing unit 37 determines, in accordance with the state of the master frame, which operation is to be performed next as dialogue processing. For example, if the text "The weather for today in Yokohama" explained with reference to FIGS. 6 and 7 is input, the dialogue processing unit 37 controls the search processing unit 39 to access a database providing information about weather forecasts and to acquire information about "weather", that is, the "target" using "today" and "Yokohama" as search keys. The database providing information about weather forecasts may be the internal database 13 or an external database. When database searching is selected, the search processing unit 39 generates an appropriate search formula in accordance with information, such as the master frame updated by the dialogue processing unit 37, accesses a predetermined database to acquire desired information, and supplies the acquired information to the dialogue processing unit 37.

The dialogue processing unit 37 puts the acquired information in a portion of the master frame corresponding to the target, and controls the output statement generator 41 to select an operation of reporting to the user the information on the weather for tomorrow in Yokohama, which is acquired by accessing the database, in accordance with a template shown in FIG. 8.

More specifically, the output statement generator 41 generates, using the template shown in FIG. 8, an output statement to be presented to the user. As shown in FIG. 8, slot names designated as targets and templates for output statements, which are responses to the corresponding targets, are provided. Parts, such as "$(place)" and "$(date)", are replaced by values in a frame format. More specifically, if the text "The weather for today in Yokohama" explained with reference to FIGS. 6 and 7 is input and "rain" is found as the search result of "weather" by the search processing performed by the search processing unit 39, the master frame is updated by processing of the dialogue processing unit 37 such that "$(place)" and "$(date)" in the template are replaced by "Yokohama" and "today", respectively, and "$(weather)" in the template, which is a target, is replaced by "rain". Thus, an output statement "The weather for today in Yokohama is rain." is generated.

In contrast, if the date slot in a master frame has not been set, such as a case where the text "The weather in Yokohama" is input or if the place slot in a master frame has not been set, such as a case where the text "The probability of rain tomorrow" is input, the date whose weather the user, i.e. the speaker, wants to know or the place whose probability of rain the user wants to know are not known. Thus, the dialogue processing unit 37 may control the output statement generator 41 to output a statement for asking the user about the wanted slot value.

In other words, if information necessary for performing search processing is not described in the master frame, the dialogue processing unit 37 controls the output statement generator 41 to select an operation of reporting a message for urging the user to input information necessary for refinement of conditions in accordance with a template shown in FIG. 9.

More specifically, the output statement generator 41 generates an output statement presented to the user using the template shown in FIG. 9. As shown in FIG. 9, slot names for which input values are required, in other words, for which the user is desired to input information, and questions corresponding to the slot names are prepared. More specifically, when the text "The weather in Yokohama" is input, a value for the slot "date" in the master frame is not input. Thus, the output statement generator 41 extracts an output statement "For which date do you want to know the weather?", which corresponds to the slot name for which an input value is required, from the templates shown in FIG. 9, and outputs the output statement.

In response to this question, the user inputs information, such as "Tomorrow" or "Yokohama". The dialogue processing unit 37 puts the supplied information in the vacant slot of the master frame to update the master frame. Then, the dialogue processing unit 37 selects the next operation, such as database searching, in accordance with the updated master frame.

For example, if a predetermined lamp is set to be lit in accordance with tomorrow's weather or if another apparatus is controlled in accordance with a result of dialogue processing, the dialogue processing unit 37 may control the control signal generator 40 to control processing of an external apparatus. If the dialogue processing unit 37 selects control of an external apparatus, the control signal generator 40 generates a control signal for controlling the external apparatus in accordance with a result of dialogue processing, and outputs the control signal to the network interface 15. The network interface 15 sends the control signal to the apparatus to be controlled and receives a response from the apparatus, if necessary, via a network.

Example statements and frame representation when dialogue processing for television program information is performed will be described with reference to FIGS. 10 to 15. In this case, in accordance with a result of dialogue processing, for example, necessary information found from a database for television program information, such as electronic program guide (EPG), is reported to a user, an instruction for tuning a channel is given to an external television receiver, and a control signal for causing an external video cassette recorder or a home server to perform recording reservation is generated and output.

FIG. 10 shows an example of frame representation used in the dialogue controller 12 when dialogue processing for television program information is performed. Each frame includes one or more slots. Each slot stores a slot name and a value for the slot name. A frame shown in FIG. 10 used for television program information includes slots whose names are "date", "name of television station", "category", "name of program", "performer", "time period", "start time", "ending time", and "operation". Such a frame is stored as a master frame in the master frame storage unit 38, and values are updated by processing of the dialogue processing unit 37. Updating of the master frame will be described below with reference to FIG. 13.

When the frame representation explained using FIG. 10 is used for a master frame, for example, examples shown in FIG. 11 are stored in the example database 33.

Each example stored in the example database 33 includes one or more example statements and a group of slots representing the semantic contents of the example statements. For example, example statements "Tell me the soccer programs on this afternoon" and "What soccer programs are on this afternoon?" and a group of slots composed of four slots constitute an example. In the slots, values for the slot names "date", "category", and "time period" are defined by "today", "soccer", and "afternoon", respectively, and a value for the slot name "name of program" is set as a target, which is information desired by a user. An example statement "What drama does Masakazu Yamamura appear in?" and a group of slots composed of three slots constitute an example. In the slots, values for the slot names "performer" and "category" are defined by "Masakazu Yamamura" and "drama", respectively, and a value for the slot name "name of program" is set as a target, which is information desired by the user.

Example statements "What time does the live baseball broadcast start?" and "What time does the live baseball broadcast on Channel 8 start?" and a group of slots composed of three slots constitute an example. In the slots, values for the slot names "name of television station" and "category" are defined by "AA Broadcasting" and "baseball", respectively, and a value for the slot name "start time" is set as a target, which is information desired by the user. An example statement "Who is the guest on Hanako's Room today?" and a group of slots composed of three slots constitute an example. In the slots, values for the slot names "date" and "name of program" are defined by "today" and "Hanako's Room" and a value for the slot name "performer" is set as a target, which is information desired by the user.

An example statement "Record" and a slot in which a value for the slot name "operation" is defined by "Recording" constitute an example. The example statement "Record" is used, for example, when a user gives an instruction to record a program corresponding to the name of a program presented by the system in the process of dialogue processing. An example statement "Tomorrow" and a slot in which a value for the slot name "date" is defined by "tomorrow" constitute an example. The example statement "Tomorrow" is used, for example, when the user answers a question by the system in the process of dialogue processing.

As described above, a pair of one or more example statements and a group of slots representing the semantic contents of the example statements is described in each example. In other words, as in the case described with reference to FIG. 5, if a plurality of example statements is stored in an example, the same group of slots is capable of representing the semantic contents of the plurality of example statements. Thus, the database structure of examples stored in the example database 33 can be simplified, and the speed of calculating similarity can be increased. In addition, text input by users is associated with representation in a frame format, and this is convenient for calculation of similarity, search processing for acquiring information by accessing a database, or generation of an output statement, as described above.

In addition, in FIG. 11, in the example including the example statements "What time does the live baseball broadcast start?" and "What time does the live baseball broadcast on Channel 8 start?" and the corresponding group of slots, an example statement including "AA Broadcasting", which is information corresponding to the slot name "name of television station", and an example statement not including "AA Broadcasting" are associated with the same group of slots, as in the case described with reference to FIG. 5. For example, since input text "What time does the live sumo broadcast start?" has nothing corresponding to the slot name "name of television station", a blank is provided as the value for the slot name "name of television station". (In other words, by processing described below, a master frame does not reflect this.) Accordingly, since example statements having different numbers of corresponding slots can be included in the same example, the number of registered examples can be further reduced. Thus, the example database can be efficiently established.

In addition, in order to perform similarity calculation, which will be described below, for example, an example statement divided in units of words, such as "who, guest, Hanako's Room, and today", in advance by morphological analysis or the like may be stored as an example.

As in the case described with reference to FIG. 5, each example is not selected to be input next by users and is irrespective of grammar rules. Thus, since examples can be added with disregard to a scenario of dialogue processing and complicated elements, such as grammar rules, the number of examples can be easily increased. In addition, in order to improve the search accuracy, examples can be deleted or changed easily if necessary.

The similarity calculator 32 calculates the similarity between an input word string and each example statement constituting each of the examples shown in FIG. 11. In other words, in the similarity calculator 32, the input text and each example statement constituting each example are analyzed morphologically and divided in units of words. As a result, for example, input text "What, does, Takuya Morimura, appear, in?" is divided into five words, and an example statement "What, drama, does, Masakazu Yamamura, appear, in?" is divided into six words. The similarity between the input word string and the example statement is calculated using a thesaurus similar to that explained with reference to FIG. 3.

Since words, such as names of television programs, are frequently updated in accordance with reprogramming, all the words may not be registered in a thesaurus. Similarly, since new entertainers come out every day, all the performers may not be registered in the thesaurus. In order to cope with such cases, with respect to data for a particular slot in the example database 33, all the values in a character string form stored in the database are listed, and the similarity calculator 32 regards the similarity between them as being the highest.

Every time the database is updated, the word list is also updated. In other words, the similarity calculator 32 regards the similarity between all the words representing specific names of programs, such as "Hanako's Room" and "Abarenbo Bugyo," that are recorded as possible values to be put in the slot for the name of a program in the example database 33 as being high. (The value of similarity is set to 0, which represents the highest similarity.)

For some types of databases, possible values in a character string format for a particular slot may be limited. In this case, similarly, a group of words whose similarity is set to 0 can be set. For example, since possible values for the slot "category" for television program information are set in advance by the content creator, only values of limited character string types correspond to the words for the slot "category", and a group of words for which the value of similarity is set to 0 can be set in advance.

Figure 12:
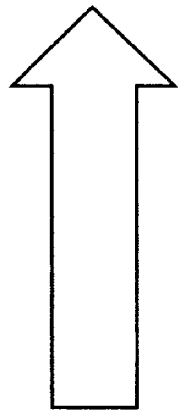
FIG. 12 is an illustration for explaining processing in the frame representation converter shown in FIG. 2 in the second example of the dialogue processing.

FIG. 12 is a conceptual diagram showing a procedure for calculating the similarity between input text "What does Takuya Morimura appear in?" and an example statement "What drama does Masakazu Yamamura appear in?" and a procedure for generating a frame format corresponding to the input text when this example statement is the most similar example statement.

The input text and the example statement are analyzed morphologically and divided in units of words. As a result, the input text "What, does, Takuya Morimura, appear, in?" is divided into five words, and the example statement "What, drama, does, Masakazu Yamamura, appear, in?" is divided into six words. The similarities between words of the input text and words of the example statement are calculated using a thesaurus, and a combination of words whose similarity is the highest is obtained. Adjuncts, such as particles, are not generally included in a thesaurus. Thus, portions corresponding to adjuncts are eliminated, and a combination of only independent words is obtained. In addition, as described above, since unique nouns, such as "Takuya Morimura" and "Masakazu Yamamura", are not registered in the thesaurus, a list of possible values, in a character string format, for performers is referred to, and the similarity between words included in the list is regarded as being high. The similarity calculator 32 outputs the calculated similarity between the input text "What does Takuya Morimura appear in?" and each example statement to the optimal example selector 35.

The optimal example selector 35 selects an example corresponding to the example statement with the highest similarity from among examples registered in the example database 33 in accordance with a result of similarity calculation for each example statement, and supplies the input word string and the example corresponding to the selected example statement, that is, the optimal example to the frame representation converter 36. For example, when the text "What does Takuya Morimura appear in?" is input, an example corresponding to the example statement "What drama does Masakazu Yamamura appear in?" is selected as the optimal example. Thus, three pairs of words, (Takuya Morimura, Masakazu Yamamura), (what, what), and (appear, appear) are obtained. The optimal example selector 35 outputs the input word string ("Takuya Morimura", "appear", and "what") and the example corresponding to the example statement "What drama does Masakazu Yamamura appear in?" to the frame representation converter 36.

Then, the frame representation converter 36 replaces the words in the group of slots for the optimal example by the words constituting the input word string to acquire a frame format corresponding to the input text, and outputs information (the group of slots) representing the frame format to the dialogue processing unit 37. In other words, since only "Masakazu Yamamura" from among the pairs of words is used in the frame format described in the example, the frame representation converter 36 outputs the group of slots in which the value "Masakazu Yamamura" is replaced by the corresponding "Takuya Morimura" and the value for the slot name "name of program" is set to "target".

Figure 13:
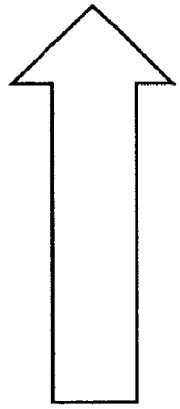
FIG. 13 is an illustration for explaining updating of a master frame in the second example of the dialogue processing.

The dialogue processing unit 37 receives information in the frame format corresponding to the input text, which is generated by the processing of the frame representation converter 36, and updates the master frame, which is described in FIG. 10, stored in the master frame storage unit 38, as shown in FIG. 13. In other words, the dialogue processing unit 37 sets the value for a slot name that is described in a frame format corresponding to the input text as the value for the same slot name in the master frame. More specifically, if the text "What does Takuya Morimura appear in?" is input, the master frame described in FIG. 10 is updated such that the value "Takuya Morimura" is described for the slot name "performer" and the value "target" is described for the slot name "name of program".

Then, the dialogue processing unit 37 determines, in accordance with the state of the master frame, which operation is to be performed next as dialogue processing. For example, if the text "What does Takuya Morimura appear in?" is input, the dialogue processing unit 37 controls the search processing unit 39 to access, for example, a database storing program information, such as EPG, and to acquire information about the "name of program" in which Takuya Morimura appears in, that is, the "target". The database storing program information may be the internal database 13 or an external database. When database searching is selected, the search processing unit 39 generates an appropriate search formula in accordance with information, such as the master frame updated by the processing of the dialogue processing unit 37, accesses a predetermined database to acquire desired information, and supplies the acquired information to the dialogue processing unit 37.

The dialogue processing unit 37 puts the acquired information in a portion of the master frame corresponding to the target, and controls the output statement generator 41 to select an operation of reporting to the user the information about the name of a program in which "Takuya Morimura" appears, which is acquired by accessing the database, in accordance with a template shown in FIG. 14.

More specifically, the output statement generator 41 generates, using the template shown in FIG. 14, an output statement to be presented to the user. As shown in FIG. 14, slot names designated as targets and templates for output statements, which are responses to the corresponding targets, are provided. Parts, such as "$(name of program)" and "$(date)", are replaced by values in a frame format. More specifically, if the text "What does Takuya Morimura appear in?" is input and "Monday Drama Special" is found as the search result of "name of program" in which "Takuya Morimura" appears in by the search processing performed by the search processing unit 39, the master frame is updated by processing of the dialogue processing unit 37 such that "$(name of program)" in the template is replaced by "Monday Drama Special". Thus, an output statement "The program Monday Drama Special was found." is generated.

When the search processing unit 39 accesses the database to search for predetermined information, a plurality of pieces of information may be found as search results. In order to cope with such cases, as shown in FIG. 14, response templates that can be used when a plurality of pieces of information is found are prepared in advance. The number of found cases may be reported to the user, and, in order to store a plurality of pieces of found data, the master frame storage unit 38 may store master frames copied for the number of found cases so that a plurality of pieces of program information can be presented if necessary.

In addition, when the search processing unit 39 accesses the database to search for predetermined information, found cases may not be output since too many cases are found. In this case, in order to narrow down the number of final search results to less than a predetermined value, a question for urging the user to input additional information can be output.

In other words, if too many cases are found as search results with respect to user input and it is difficult to output the found cases, the dialogue processing unit 37 controls the output statement generator 41 to select an operation of reporting a message for urging the user to input information necessary for refinement of conditions in accordance with a template shown in FIG. 15.

More specifically, the output statement generator 41 generates, using the template shown in FIG. 15, an output statement to be presented to the user. As shown in FIG. 15, slot names for which input values are required, in other words, for which the user is desired to input information, and questions corresponding to the slot names are prepared. More specifically, when the text "What does Takuya Morimura appear in?" is input, the value for the slot "date" in the master frame is not input. Thus, the output statement generator 41 may extract and output an output statement "Which date are you interested in?", which corresponds to the slot name for which an input value is required, from the templates shown in FIG. 15. Alternatively, since the value for the slot "category" in the master frame is not input, the output statement generator 41 may extract and output an output statement "Which category are you interested in?", which corresponds to the slot name for which an input value is required, from the templates shown in FIG. 15. Alternatively, since the value for the slot "time period" in the master frame is not input, the output statement generator 41 may extract and output an output statement "Which time period are you interested in?", which corresponds to the slot name for which an input value is required, from the templates shown in FIG. 15. In addition, by defining in advance which slot information in the master frame has priority, the dialogue processing unit 37 can perform dialogue processing such that high-priority information is queried first.

In response to this question, the user inputs information, such as "Tomorrow", "Music", or "Afternoon". The dialogue processing unit 37 puts the supplied information in the vacant slot of the master frame to update the master frame. Then, the dialogue processing unit 37 selects the next operation, such as database searching, in accordance with the updated master frame. The dialogue processing unit 37 may control the output statement generator 41 to output an output statement in the templates shown in FIG. 15 to urge the user to input information corresponding to the vacant slot of the master frame until the number of final search results is narrowed down to less than a predetermined value.

The dialogue processing unit 37 not only accesses a database for program information to search for the name of a program but also, for example, causes the output statement generator 41 to store in advance questions, such as "Do you want to watch or record this program?" and "Do you want to search for a program from recorded programs and play back the found program?", as templates, to report these questions to the user after reporting to the user the name of a program, which is the search result. In accordance with a response supplied from the user, the dialogue processing unit 37 can also control the power and tuning of a television receiver at a start time of the corresponding program to operate the apparatus so that the program desired by the user is viewable or to record the corresponding program using a video cassette player or a home server by processing of the control signal generator 40 for controlling network-compatible household electrical appliances connected using home networking. In addition, instead of accessing the program information database, the dialogue processing unit 37 can control the search processing unit 39 to use a list of video content recorded on a home server connected via a network as a database, according to need, to search for a program desired by the user from among recorded programs, and to read and play back the found program if the corresponding program is recorded.

Accordingly, each example includes text information and a group of slots. Thus, the foregoing dialogue processing can deal with a wider variety of input text. In addition, there is no need to describe grammar rules for interpreting input text, and the complexity of operation when users who do not have linguistic knowledge establish a dialogue system for a new topic can be reduced.

Dialogue process 1 performed by the dialogue processing apparatus 1 shown in FIG. 1 is described next with reference to a flowchart shown in FIG. 16.

In step S1, the text data input section 11 determines whether or not text data input by a user is received. If the text data input section 11 determines that text data is not received in step S1, the processing in step S1 is repeated until the dialogue processing apparatus 1 determines that text data is received.

If the text data input section 11 determines that text data is received in step S1, the text data input section 11 supplies the input text data to the dialogue controller 12, and the dialogue processing unit 37 of the dialogue controller 12 resets the description of a value in a master frame stored in the master frame storage unit 38, if necessary, in step S2. More specifically, for example, although the dialogue processing unit 37 does not reset the description of a value in a master frame if the dialogue processing unit 37 outputs a question to the user in the last dialogue processing, the dialogue processing unit 37 resets the description of a value in the master frame if the dialogue processing unit 37 controls an external apparatus in the last dialogue processing.

In step S3, the similarity calculator 32 receives text supplied from the text information acquisition unit 31 of the dialogue controller 12, divides the input text in units of words, generates an input word string by eliminating particles, calculates the similarity between the input word string and each example statement registered in the example database 33 by referring to a thesaurus stored in the thesaurus storage unit 34, and supplies the similarity score, which is the calculation result of the similarity, to the optimal example selector 35.

In step S4, the optimal example selector 35 selects an optimal example from examples registered in the example database 33 in accordance with the calculation results of the similarity, and supplies the optimal example and the input word string to the frame representation converter 36.

In step S5, the frame representation converter 36 converts the input text into frame representation by replacing a group of slots constituting the optimal example by words constituting the input word string in accordance with the description of the selected optimal example, and supplies the converted group of slots to the dialogue processing unit 37.

In step S6, the dialogue processing unit 37 reads the master frame stored in the master frame storage unit 38, and updates the description of the master frame in accordance with the converted group of slots supplied from the frame representation converter 36.

In step S7, the dialogue processing unit 37 determines, in accordance with the state of the master frame, whether or not to perform database searching. More specifically, if a value in a slot is set to a target and information necessary for database searching is described in other slots; for example, in a case where the text "The weather for tomorrow in Yokohama" or "What drama does Masakazu Yamamura appear in?" is input, the dialogue processing unit 37 determines that search processing using the internal database 13 or an external database should be performed in dialogue processing. In contrast, if no value in a slot is set to a target and information necessary for database searching is not described in any slot, the dialogue processing unit 37 determines that different processing should be performed in the dialogue processing, instead of performing search processing using the internal database 13 or the external database.

If the dialogue processing unit 37 determines that database searching should be performed in step S7, the dialogue processing unit 37 controls the search processing unit 39 to perform search processing in step S8. The search processing unit 39 generates an appropriate search formula using values in slots constituting the master frame updated by the processing of the dialogue processing unit 37, acquires desired information by accessing a database (the internal database 13 or an external database), and supplies the acquired information to the dialogue processing unit 37.

In step S9, the dialogue processing unit 37 puts the acquired information in a portion of the master frame corresponding to the target in accordance with the supplied search result, and updates the description of the master frame. Then, the process returns to step S7 and repeats the subsequent processing.

If the dialogue processing unit 37 determines that database searching need not be performed in step S7, the dialogue processing unit 37 determines whether or not to output a control signal in step S10. More specifically, for example, if the text "Record" is input, the dialogue processing unit 37 controls the control signal generator 40 to generate and output a control signal for controlling a predetermined external apparatus by referring to information described in the current main frame.

If the dialogue processing unit 37 determines that a control signal should be output in step S10, the dialogue processing unit 37 controls the control signal generator 40 to control processing of the predetermined external apparatus connected via the network interface 15 in step S11. The control signal generator 40 generates, under the control of the dialogue processing unit 37, the control signal for controlling the external apparatus in accordance with results of the dialogue processing so far, and outputs the generated control signal to the network interface 15. The network interface 15 sends the control signal to the apparatus to be controlled via a network.

In step S12, the network interface 15 receives a response from the apparatus to which the control signal is output, and outputs the received response to the control signal generator 40 of the dialogue controller 12. The control signal generator 40 supplies the received response to the dialogue processing unit 37, and the process ends.

If the dialogue processing unit 37 determines that a control signal need not be output in step S10, the dialogue processing unit 37 controls the output statement generator 41 to generate an output statement to the user in step S13. More specifically, this occurs when an output statement needs to be generated and output to the user in order to provide information to the user; for example, when the search results obtained by the processing in step S8 and S9 need to be reported to the user using the template explained with reference to FIG. 8 or FIG. 14, when a question needs to be output to the user using the template explained with reference to FIG. 9 or FIG. 15 since information necessary for performing search processing is not described in the master frame, or when a question, such as "Do you want to watch or record this program?" or "Do you want to search for a program from recorded programs and play back the found program?", needs to be output to the user in accordance with the contents of the last dialogue processing. Under the control of the dialogue processing unit 37, the output statement generator 41 generates an output statement to the user using the template shown in FIG. 8, FIG. 9, FIG. 14, or FIG. 15, and outputs the generated output statement to the output controller 14.

In step S14, the output controller 14 outputs the output statement to be presented to the user, by displaying it as text or an image, by processing in the display unit capable of displaying text and image information and the display control unit for controlling the display unit, or outputs the output statement, by using speech, by processing in the speaker outputting speech and the speech processing unit for processing speech data output from the speaker. Then, the process ends.

By the foregoing processing, the similarity between text input by a user and each example statement in frame representation is calculated, an optimal example is selected in accordance with the calculated similarity, a value in a slot in a master frame is updated, and dialogue processing is performed in accordance with the updated master frame. Thus, the user can acquire desired information and can give a desired operational instruction to a network apparatus by exchanging questions and answers in natural language, instead of, for example, selecting a plurality of possible statements.

In addition, compared with a procedure for describing rules, such as grammar, and processing speech input by users, the dialogue processing adopted here can implement processing for a new topic easily. In addition, for a format of an example used for dialogue process 1 described using the flowchart in FIG. 16, in particular, even administrators who are not familiar with rules, such as grammar, can change or add (increase the number of) examples easily. Thus, the foregoing dialogue processing can deal with a wider variety of input text.

Although a case where text input by a user for dialogue processing is input as text data has been described, for example, text data obtained by analyzing speech data produced by the user and by performing speech processing on the speech data may be used as text input by the user.

Figure 17:
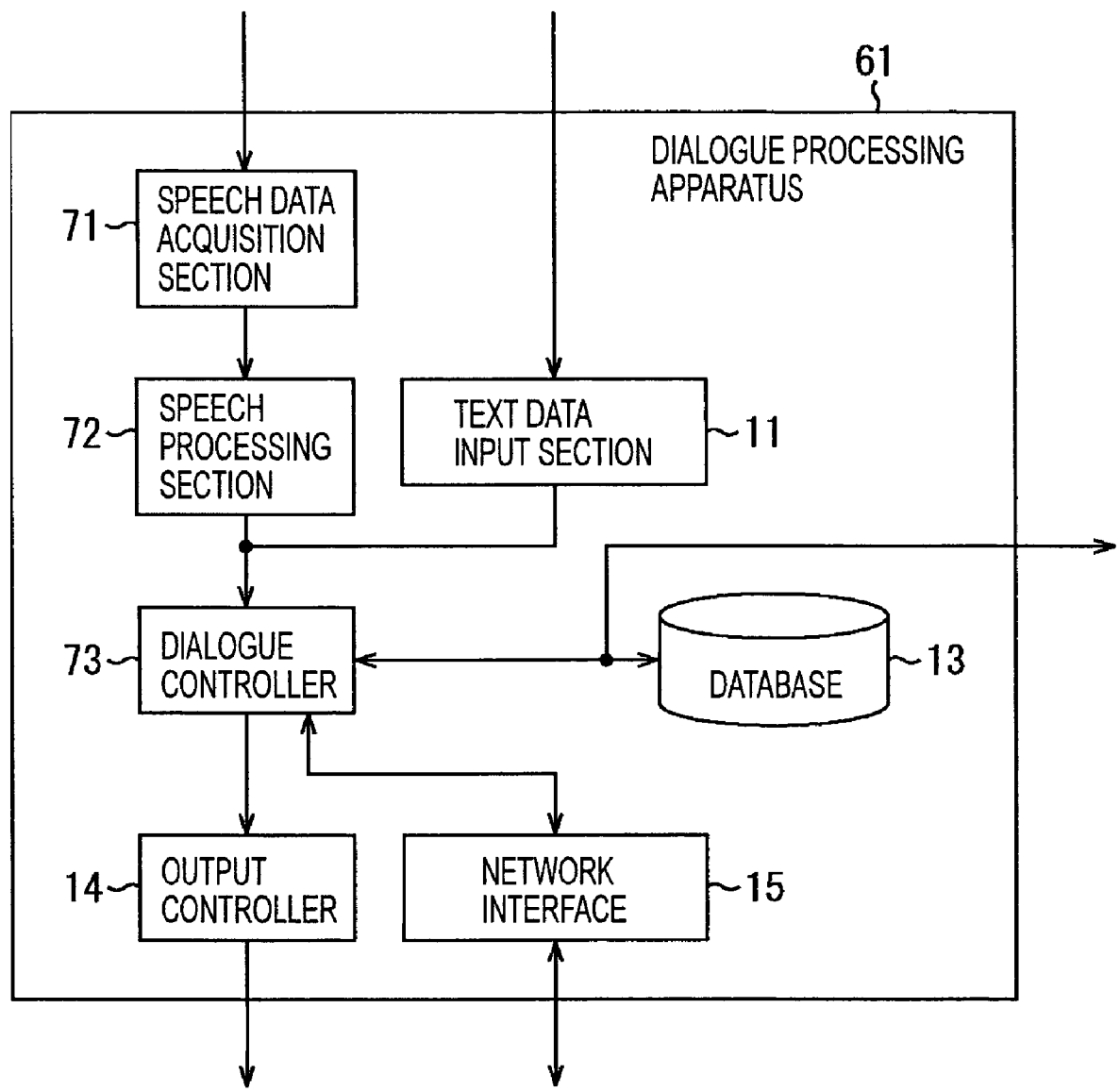
FIG. 17 is a block diagram showing the structure of a dialogue processing apparatus according to another embodiment of the present invention.

FIG. 17 is a block diagram showing the structure of a dialogue processing apparatus 61 according to a second embodiment of the present invention. The dialogue processing apparatus 61 is capable of acquiring text data by acquiring speech data corresponding to user's speech and performing speech processing on the speech data, as well as acquiring text input by a user.

In FIG. 17, the same portions as in the first embodiment shown in FIG. 1 are referred to with the same reference numerals and the descriptions of those same parts will not be repeated here. In other words, the dialogue processing apparatus 61 has basically a similar structure to the dialogue processing apparatus 1 shown in FIG. 1, with the exception that the dialogue processing apparatus 61 further includes a speech data acquisition section 71 and a speech processing section 72 and that the dialogue processing apparatus 61 includes a dialogue controller 73 instead of the dialogue controller 12.

The speech data acquisition section 71 includes, for example, a microphone converting a voice, which is a so-called air wave, into a speech signal, which is an electric wave, and an amplifier amplifying the speech signal output from the microphone. The speech data acquisition section 71 supplies the acquired analog speech signal to the speech processing section 72. The speech processing section 72 performs speech recognition processing for processing the acquired speech signal and recognizing the speech signal as text data, and supplies the text data to the dialogue controller 73.

The dialogue controller 73 performs dialogue processing in accordance with the text data supplied from the text data input section 11 or the speech processing section 72. The dialogue controller 73 also accesses the database 13 or an external database to acquire information desired by the user. The dialogue controller 73 also generates an output statement corresponding to an answer to a user's query or corresponding to a notice for urging the user to input information necessary for acquiring an answer, and supplies the generated output statement to the output controller 14. The dialogue controller 73 also generates a control signal for controlling an external apparatus, and outputs the generated control signal to the corresponding apparatus via the network interface 15. In addition to such functions, the dialogue controller 73 can acquire information about the reliability of speech recognition processing performed by the speech processing section 72 and causes the calculated similarity in dialogue processing to reflect this information.

Figure 18:
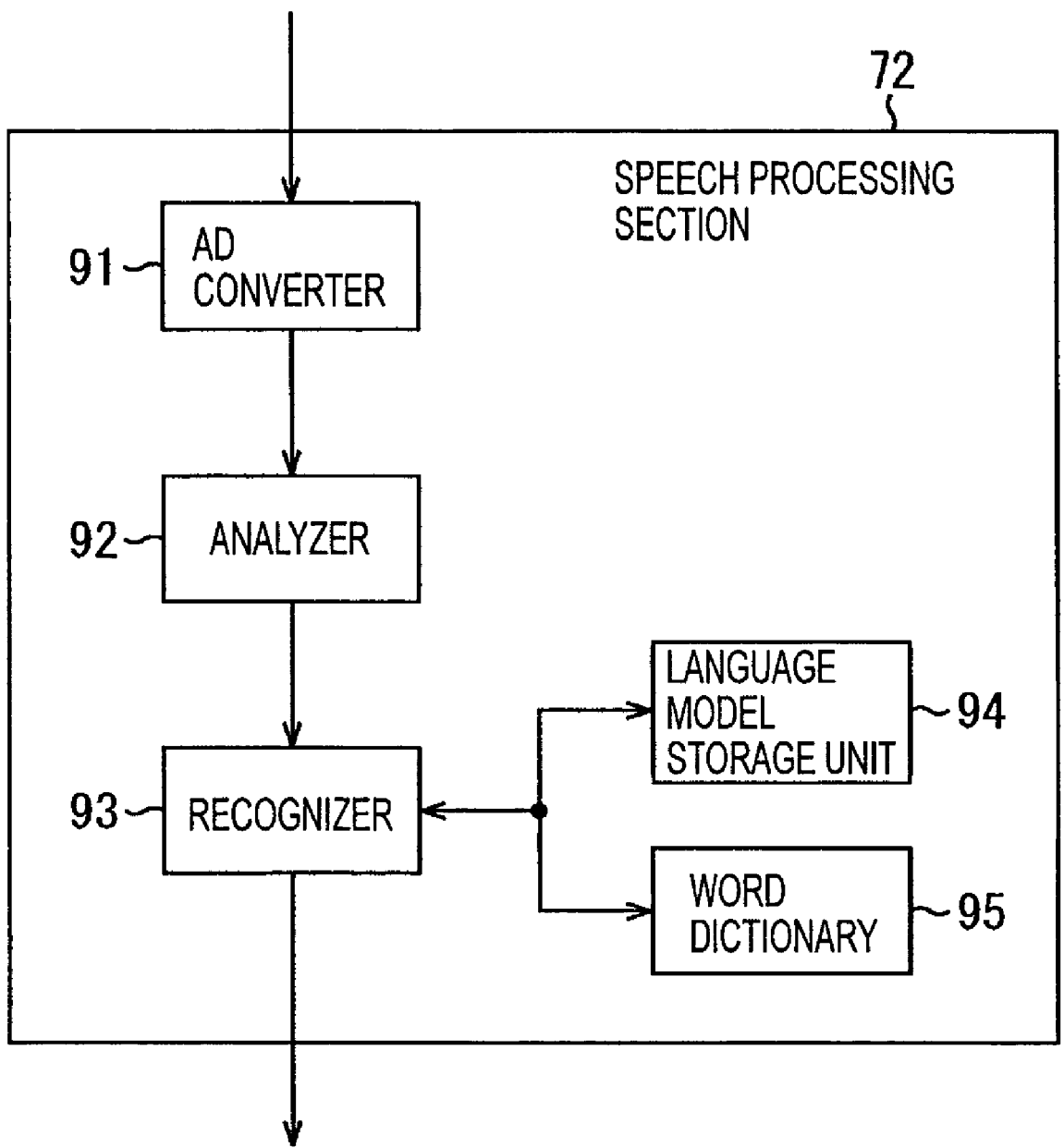
FIG. 18 is a block diagram showing the structure of a speech processing section shown in FIG. 17.

FIG. 18 is a block diagram showing the structure of the speech processing section 72.

An analog-to-digital (AD) converter 91 quantizes an analog speech signal output from the speech data acquisition section 71 by sampling it with a predetermined clock timing, and converts the analog speech signal into digital speech data.

An analyzer 92 performs sound analysis of the speech signal output from the AD converter 91 to extract a characteristic parameter of the speech, such as a speech power for each predetermined frequency band, a linear predictive coefficient (LPC), or a cepstrum coefficient. In other words, the analyzer 92, for example, performs filtering on the speech data for each predetermined frequency band using a filter bank, and rectifies and smoothes the filtered results, so that a speech power can be obtained for each predetermined frequency band. Alternatively, the analyzer 92 performs, for example, linear predictive coding on the input speech to obtain a linear predictive coefficient or a cepstrum coefficient from the linear predictive coefficient.

The characteristic parameter obtained by the analyzer 92 is output to the recognizer 93, or vector-quantized, if necessary, and output to the recognizer 93.

A recognizer 93 performs speech recognition by referring to a language model storage unit 94 and a word dictionary 95 in accordance with a speech recognition algorithm, such as a dynamic programming (DP) matching method or a hidden Markov model (HMM), on the basis of the characteristic parameter (or a symbol obtained by vector-quantizing the characteristic parameter) from the analyzer 92, and outputs the speech recognition result to the dialogue controller 73. In addition, the recognizer 93 outputs reliability representing the certainty of the speech recognition result, as well as the speech recognition result, to the dialogue controller 73.

The language model storage unit 94 stores a statistical language model, such as a bigram or a trigram. The recognizer 93 performs the foregoing speech recognition processing by appropriately skipping by beam searching using, for example, a Viterbi algorithm under loose linguistic restrictions based on the language model stored in the language model storage unit 94, and outputs the speech recognition result to the dialogue controller 73. In this case, since the recognizer 93 refines the search space until a speech recognition result is acquired, the amount of calculation in the speech recognition processing by the speech processing section 72 can be reduced, and the speed of the speech recognition processing can be increased.

Here, the bigram and trigram are, for example, primary and secondary Markov process models. The bigram and trigram are known as models that learn chaining probability of a phoneme, a syllable, a word, and the like based on a large-volume text database and that are capable of approximating a local characteristic of natural language with high accuracy.

In addition, language restrictions can be provided using, for example, a finite state network, instead of using a language model.

In the word dictionary 95, an entry of a word for which speech recognition is performed (for example, the entry for a word "invention" is "invention"), phonological information (reading) of the word, and, if necessary, other information, such as a word class of the word, are stored (registered) in association with each other. Here, at least words constituting examples stored in the example database 33 of the dialogue controller 73 are stored in the word dictionary 95. The recognizer 93 performs speech recognition for the words stored in the word dictionary 95.

HMMs are briefly described next as an example of a speech recognition algorithm used for speech recognition performed by the recognizer 93. HMMs are defined as non-deterministic finite-state automatons. The models include some states and paths representing transitions between the states. In such models, a transition process between states is referred to as a Markov process, and model learning is performed such that a symbol is output at each state transition. If a model includes N states and K types of symbols are output from the model (states), the probability aij (state transition probability) of a transition from state i to state j and the probability (output symbol probability) bij(yk) of outputting a symbol yk at the transition can be obtained in this learning using many pieces of learning data, where the following conditions are met:

$$0 < i, j < N+1, \text{ and } 0 < k < K+1$$

The probability πi (initial state probability) of being in state i at the beginning is one of the parameters of HMMs. Normally, in speech recognition, however, a left-to-right model in which a state is only allowed to be in the same state or to transit to its right-side state is used. Thus, the initial state is the leftmost state of the model. (The probability of being in the leftmost state at the beginning is set to "1" and the probability of being in other states at the beginning is set to "0".) Thus, normally, the initial state probability need not be acquired in learning.

In contrast, in the process of recognition, the occurrence probability, that is, the probability of a symbol series output from the analyzer 92 being observed (arising) is calculated using the state transition probability and the output symbol probability that are acquired by learning, and the probability whose value is the highest is regarded as a recognition result.

In the second embodiment, a phonemic model, that is, a model in units of phonemes, acquired by learning in advance is stored in the recognizer 93. The recognizer 93 connects phonemic models by referring to phonological information of words registered in the word dictionary 95, and generates models of the words registered in the word dictionary 95. The occurrence probability is calculated using the models, and a word whose probability is the highest is obtained. The recognizer 93 outputs the calculated occurrence probability as the reliability to the dialogue controller 73.

Instead of phonemic models, for example, word models, that is, models in units of words, may be stored in the recognizer 93, so that continuous speech recognition can be performed using the models.

Furthermore, the recognizer 93 may perform the foregoing processing by appropriately skipping by beam searching using, for example, a Viterbi algorithm under loose linguistic restrictions based on the bigram or trigram stored in the language model storage unit 94.

Figure 19:
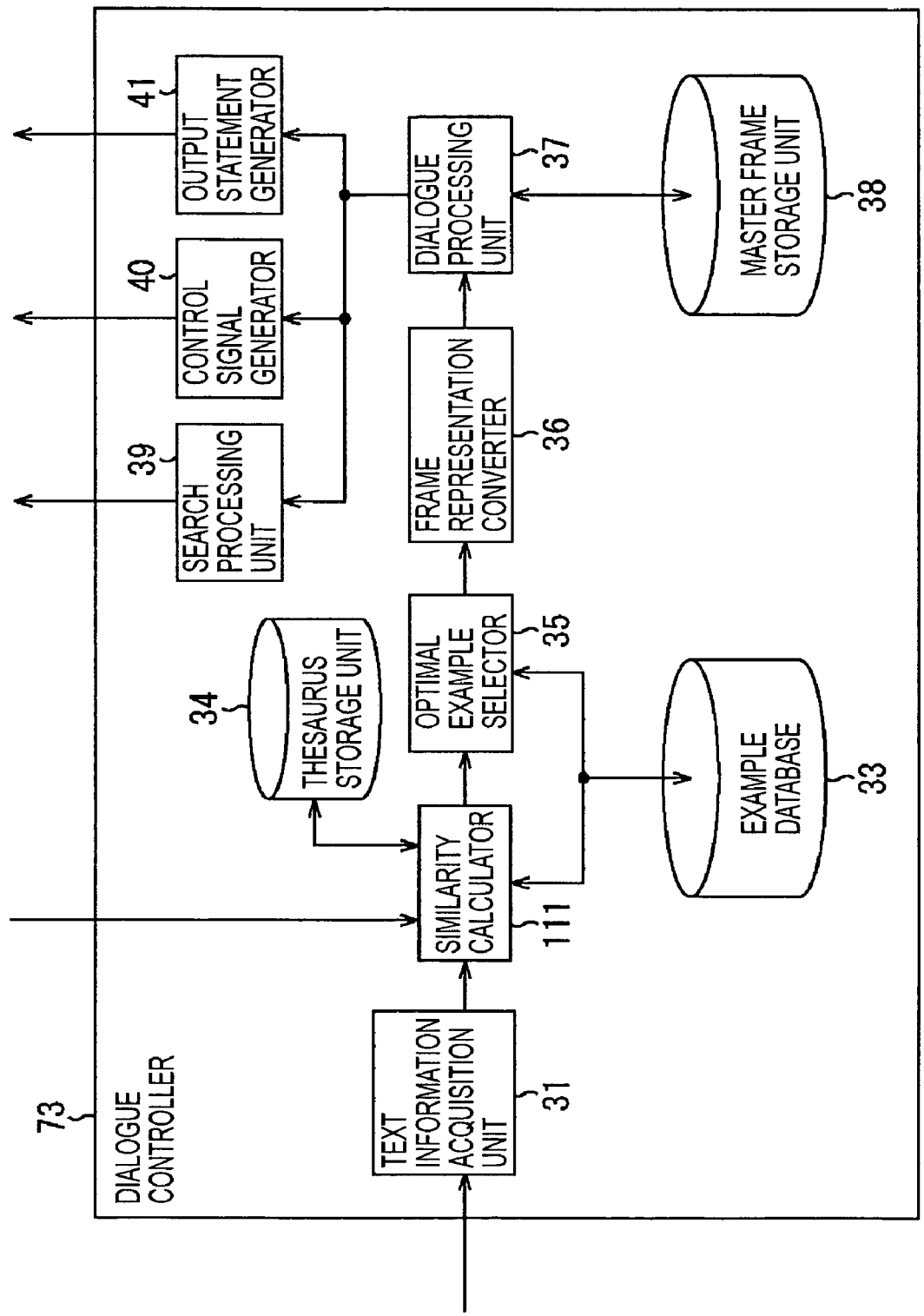
FIG. 19 is a block diagram showing the structure of a dialogue controller shown in FIG. 17.

FIG. 19 is a block diagram showing the structure of the dialogue controller 73 shown in FIG. 17.

In FIG. 19, the same portions as in the first embodiment shown in FIG. 2 are referred to with the same reference numerals and the descriptions of those same parts will not be repeated here. In other words, the dialogue controller 73 shown in FIG. 19 has basically a similar structure to the dialogue controller 12 shown in FIG. 2, with the exception that the dialogue controller 73 includes a similarity calculator 111 instead of the similarity calculator 32.

The similarity calculator 111 operates basically similar to the similarity calculator 32 shown in FIG. 2. The similarity calculator 111 morphologically analyzes text representing the content of user's speech acquired by speech analysis or text input by the user and an example statement constituting each example, divides each of them in units of words, calculates the similarity between the input word string and each example statement, and outputs the calculation result to the optimal example selector 35. The similarity calculator 111 is also capable of using the reliability of speech recognition supplied from the speech processing section 72.

In other words, after calculating the similarity between the input word string and each example statement, each of them being divided in units of words, the similarity calculator 111 performs weighting on the similarity in accordance with the reliability of speech recognition supplied from the speech processing section 72. In other words, the similarity calculator ill is capable of taking into consideration an acoustic score assigned to the text as a result of speech recognition when calculating the similarity. Thus, the processing robustness for input text including an error when a speech recognition result is used can be improved.

The thesaurus storage unit 34 stores at least words registered in the word dictionary 95 of the speech processing section 72 described with reference to FIG. 18 by categorizing the words by concept.

Dialogue process 2 performed by the dialogue processing apparatus 61 shown in FIG. 17 is described next with reference to flowcharts shown in FIGS. 20 and 21. If the text data input section 11 receives text data input by a user, processing basically similar to dialogue process 1 described using the flowchart in FIG. 16 is performed by the dialogue processing apparatus 61 in FIG. 17. Thus, processing when the speech data acquisition section 71 acquires speech data will be described here.

In step S41, the speech data acquisition section 71 determines whether or not speech data input by the user is received. If the speech data acquisition section 71 determines that speech data is not received in step S41, the processing in step S41 is repeated until the speech data acquisition section 71 determines that speech data is received.

If the speech data acquisition section 71 determines that speech data is received in step S41, the speech data acquisition section 71 supplies the input speech data to the speech processing section 72 in step S42. The speech processing section 72 performs speech analysis, and outputs the speech analysis result to the dialogue controller 73. More specifically, as described with reference to FIG. 18, in the speech processing section 72, the AD converter 91 quantizes an analog speech signal output from the speech data acquisition section 71 by sampling it at a predetermined clock timing, and the analyzer 92 performs sound analysis of the speech signal to extract a characteristic parameter of the speech, such as a speech power for each predetermined frequency band, a linear predictive coefficient, or a cepstrum coefficient or to obtain the linear predictive coefficient by performing linear predictive coding or the cepstrum coefficient from the linear predictive coefficient. The recognizer 93 performs speech recognition by referring to the language model storage unit 94 and the word dictionary 95 in accordance with a speech recognition algorithm, such as a DP matching method or an HMM, on the basis of the characteristic parameter (or a symbol obtained by vector-quantizing the characteristic parameter) supplied from the analyzer 92, and acquires the speech recognition result. In addition to the speech recognition result, the recognizer 93 acquires reliability representing the certainty of the speech recognition result.

In step S43, the text information acquisition unit 31 of the dialogue controller 73 acquires the text data acquired by the speech analysis, and the similarity calculator 111 of the dialogue controller 73 acquires reliability information when the speech analysis is performed.

In step S44, the dialogue processing unit 37 of the dialogue controller 73 resets the description of a value in a master frame stored in the master frame storage unit 38 if necessary.

In step S45, the text information acquisition unit 31 of the dialogue controller 73 supplies the acquired text data to the similarity calculator 111, and the similarity calculator 111 divides the input text in units of words to generate an input word string by eliminating particles, and calculates the similarity between the input word string and each example statement registered in the example database 33 by referring to a thesaurus stored in the thesaurus storage unit 34.

In step S46, the similarity calculator 111 performs weighting on the calculated similarity in accordance with the supplied reliability, and supplies the weighted similarity to the optimal example selector 35. In other words, the similarity calculator ill is capable of taking into consideration an acoustic score assigned to the text as a result of speech recognition when calculating the similarity.

In step S47, the optimal example selector 35 selects an optimal example from examples registered in the example database 33 in accordance with the calculation result of weighted similarity, and supplies the input word string and the selected example, that is, the optimal example to the frame representation converter 36.

Figure 16:
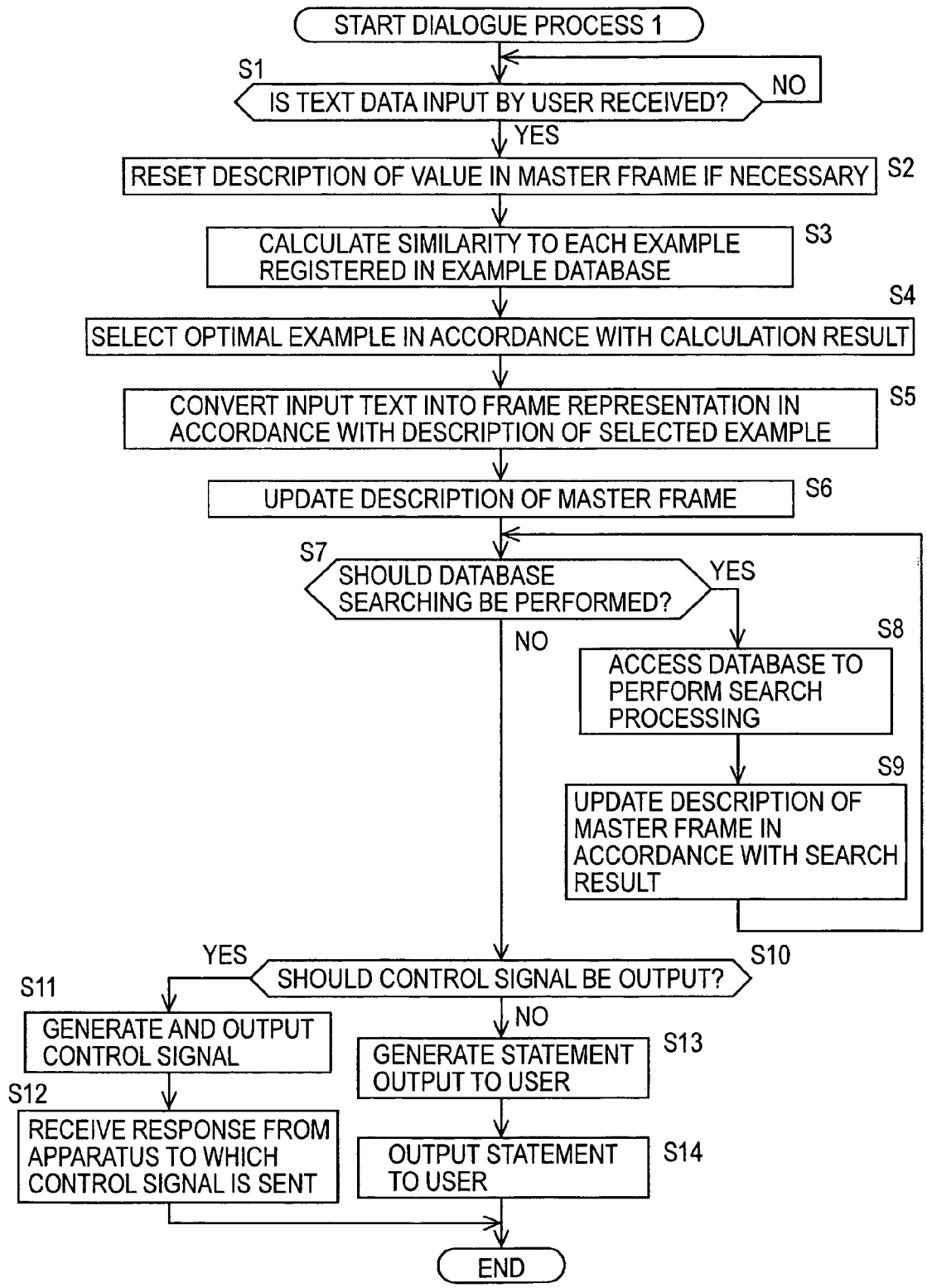
FIG. 16 is a flowchart of a first dialogue process.

In steps S48 to S57, similar processing to processing in steps S5 to S14 in FIG. 16 is performed.

In other words, the input text is converted into frame representation in accordance with the description of the optimal example, the description of the master frame is updated in accordance with the converted group of slots, and it is determined whether or not database searching should be performed in accordance with the state of the master frame. If it is determined that database searching should be performed, searching processing is performed to acquire desired information, and the description of the master frame is updated such that the acquired information is put in a portion of the master frame corresponding to a target.

If it is determined that database searching need not be performed, it is determined whether or not a control signal should be output. If it is determined that a control signal should be output, a control signal for controlling processing of a predetermined external apparatus connected via the network interface 15 is generated. The control signal is sent to the apparatus via the network interface 15 and a network, and a response from the apparatus to which the control signal is sent is received.

If it is determined that a control signal need not be output, an output statement to be presented to the user is generated using the template shown in FIG. 8, FIG. 9, FIG. 14, or FIG. 15. The generated output statement is output by displaying it as text or an image or by using speech. Then, the process ends.

By the foregoing processing, the similarity between each example statement in frame representation and text input by a user or text acquired by performing speech recognition of user's speech is calculated, an optimal example is selected in accordance with the calculated similarity, a value in a slot in a master frame is updated, and dialogue processing is performed in accordance with the updated master frame. Thus, the user can acquire desired information and can give a desired operational instruction to a network apparatus by exchanging questions and answers in natural language without, for example, selecting a plurality of possible statements. In addition, weighting is performed on similarity using reliability information representing the certainty of a speech recognition result. Thus, the processing robustness for input text including an error when a speech recognition result is used can be improved.

Although a case where dialogue processing is performed only in accordance with user input has been described, a dialogue history and a user profile, which are information on previous dialogue processing, may be stored so that dialogue processing can be performed in accordance with such information.

Figure 22:
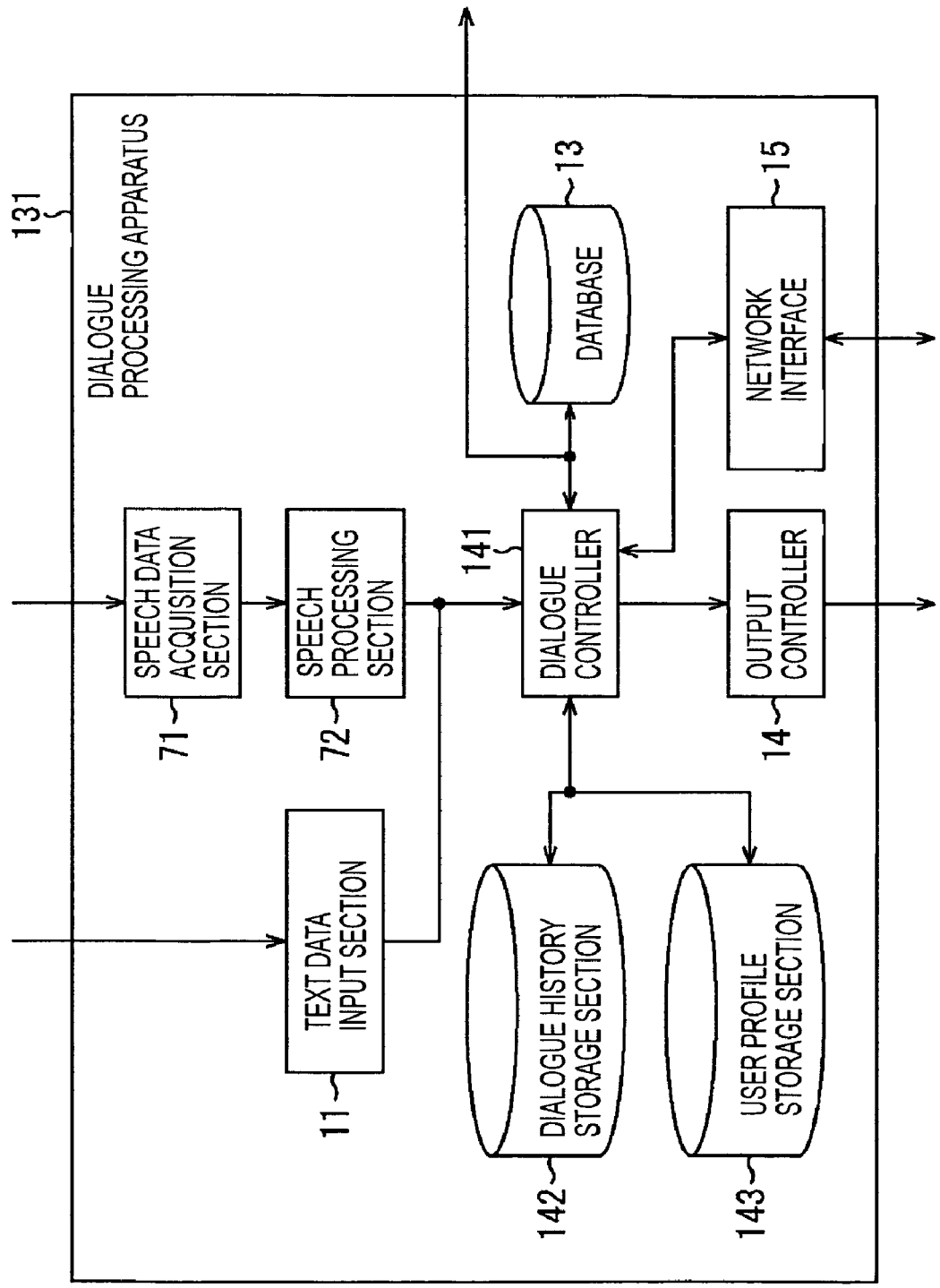
FIG. 22 is a block diagram showing the structure of a dialogue processing apparatus according to another embodiment of the present invention.

FIG. 22 is a block diagram showing the structure of a dialogue processing apparatus 131 according to a third embodiment of the present invention. The dialogue processing apparatus 131 is capable of acquiring text data by acquiring speech data corresponding to user's speech and performing speech processing on the speech data, as well as acquiring text input by a user. The dialogue processing apparatus 131 is also capable of controlling dialogue processing in accordance with a dialogue history and a user profile stored therein.

In FIG. 22, the same portions as in the second embodiment shown in FIG. 17 are referred to with the same reference numerals and the descriptions of those same parts will not be repeated here. In other words, the dialogue processing apparatus 131 shown in FIG. 22 has basically a similar structure to the dialogue processing apparatus 61 shown in FIG. 17, with the exception that the dialogue processing apparatus 131 further includes a dialogue history storage section 142 and a user profile storage section 143 and that the dialogue processing apparatus 131 includes a dialogue controller 141 instead of the dialogue controller 73.

The dialogue controller 141 performs dialogue processing in accordance with the text data supplied from the text data input section 11 or the speech processing section 72. The dialogue controller 141 also accesses the database 13 or an external database to acquire information desired by the user. The dialogue controller 141 also generates an output statement corresponding to an answer to a user's query or corresponding to a notice for urging the user to input information necessary for acquiring an answer, and supplies the generated output statement to the output controller 14. The dialogue controller 141 also generates a control signal for controlling an external apparatus, and outputs the generated control signal to the corresponding apparatus via the network interface 15.

In the dialogue processing, according to need, the dialogue controller 141 acquires information on the reliability of speech recognition performed by the speech processing section 72, dialogue history information stored in the dialogue history storage section 142, or a user profile stored in the user profile storage section 143, and causes the calculated similarity to reflect such information. In addition, as a result of the dialogue processing, the dialogue controller 141 is capable of supplying necessary information to the dialogue history storage section 142 or the user profile storage section 143 to be stored or to be analyzed and stored.

The dialogue history storage section 142 stores a history of previous dialogue processing. For example, a calculated value of similarity for each example statement in the last dialogue processing, a value in each slot in a master frame in a predetermined number of previous dialogue processing operations, and the like are stored in the dialogue history storage section 142. Every time new information is stored in the dialogue history storage section 142, the oldest information may be disposed of, so that the storage capacity can be efficiently used to store an up-to-date dialogue history.

User profile information, such as personal information and a behavior pattern of the user, is stored in the user profile storage section 143. More specifically, the user profile storage section 143 is capable of storing personal information, such as the name, sex, age, and address of the user, and a behavior pattern unique to the user, such as the time period at which dialogue processing is often performed, the contents of dialogue processing that are often performed, and the category and time period of a program the user likes to watch. Personal information of the user is registered by user input. On the other hands, a behavior pattern unique to the user is registered not only by user input. For example, the user profile storage section 143 may have a function to accumulate and analyze previous dialogue processing and the results supplied from the dialogue controller 141, so that the result obtained by the analysis can be registered as a behavior pattern.

Figure 23:
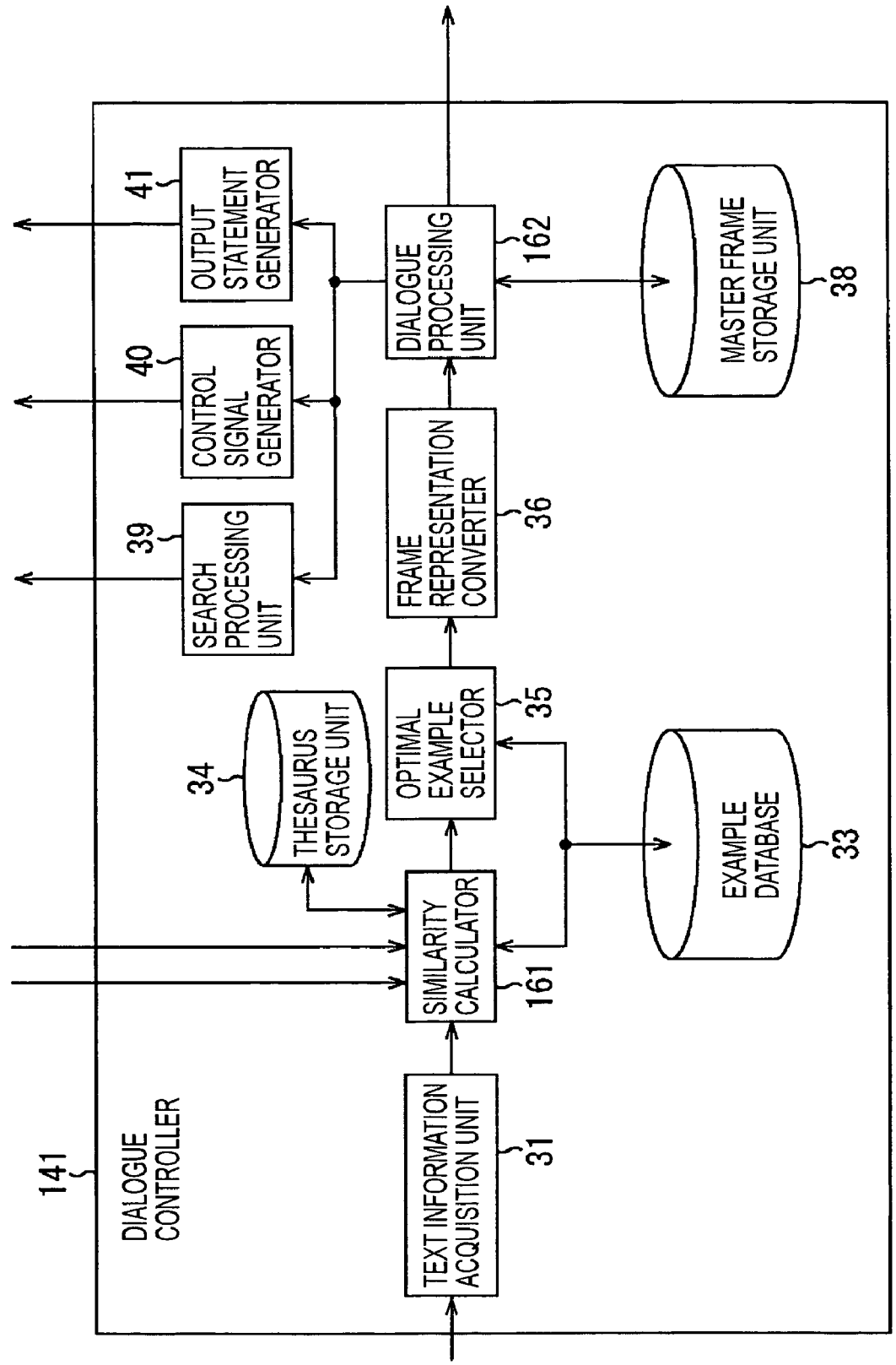
FIG. 23 is a block diagram showing the structure of a dialogue controller shown in FIG. 22.

FIG. 23 is a block diagram showing the structure of the dialogue controller 141 shown in FIG. 22.

In FIG. 23, the same portions as in the second embodiment shown in FIG. 19, are referred to with the same reference numerals and the descriptions of those same parts will not be repeated here. In other words, the dialogue controller 141 shown in FIG. 23 has basically a similar structure to the dialogue controller 73 shown in FIG. 19, with the exception that the dialogue controller 141 includes a similarity calculator 161 instead of the similarity calculator 111 and a dialogue processing unit 162 instead of the dialogue processing unit 37.

The similarity calculator 161 operates basically similar to the similarity calculator 73 described with reference to FIG. 19. The similarity calculator 161 morphologically analyzes text representing the content of user's speech acquired by speech analysis or text input by the user and an example statement constituting each example, divides each of them in units of words, calculates the similarity between the input word string and each example statement, performs weighting on the similarity using the reliability of speech recognition supplied from the speech processing section 72 if necessary, and outputs the calculation result to the optimal example selector 35. The similarity calculator 161 is also capable of acquiring dialogue history information stored in the dialogue history storage section 142 and user profile information stored in the user profile storage section 143 and causing the calculated similarity to reflect such information.

In other words, if the current dialogue processing is performed almost immediately after the last dialogue processing, in terms of time, in accordance with dialogue history information stored in the dialogue history storage section 142, since such dialogue has a high possibility of involving related topics, the similarity for the example statement calculated in the last dialogue processing can be used as a correction value, if necessary.

For example, if the text "The weather for today in Yokohama" was input by the user in the last dialogue processing, an input word string ("Yokohama", "today", and "weather") is obtained. In this case, the similarity between the input word string ("Yokohama", "today", and "weather") and the example statement "Tell me the weather for tomorrow in Tokyo" is ¾, as described above. In contrast, if the text "Tokyo" is input by the user in the current dialogue processing, although the user wants to know the weather for today in Tokyo, the similarity between the input word string "Tokyo" and the example statement "Tell me the weather for tomorrow in Tokyo" is low when the similarity is calculated by a normal procedure. In the third embodiment, the similarity calculator 161 is capable of using a value of a similarity score for each example statement calculated by the last dialogue processing as a correction value or a value for weighting. For example, a predetermined proportion of a value of a similarity score for each example statement calculated in the last dialogue processing may be subtracted from the calculated similarity score, so that the obtained value can be used as a correction value for the similarity score. Accordingly, if the text "The weather for today in Yokohama" was input by the user in the last dialogue processing and the text "Tokyo" is input by the user in the current dialogue processing, the calculation result of the similarity between the input word string and the example statement "Tell me the weather for tomorrow in Tokyo" can exhibit a high similarity.

In addition, the similarity calculator 161 is capable of correcting similarity in accordance with the user profile information stored in the user profile storage section 143. For example, in accordance with a profile of a user's normal behavior pattern stored in the user profile storage section 143, for a user who queries the broadcast time of a nightly game, acquires an answer to the query, and performs recording reservation every morning, the similarity calculator 161 is capable of calculating the similarity between an input word string and an example statement "What time does the baseball broadcast start?" or an example statement "Record" using a correction value for causing the similarity to be high in the morning period. In addition, in accordance with user profile information stored in the user profile storage section 143, for a user who lives in, for example, Tokyo, the similarity calculator 161 may perform weighting in the calculation of a similarity score such that the similarity between the input text "The weather for tomorrow" and an example statement "Tell me the weather for tomorrow in Tokyo" in which "Tokyo" is provided as a value for the slot name "place" can exhibit a high similarity.

A correction value based on such dialogue history and user profile can be calculated using a probability value obtained using a Bayesian network or the like. The Bayesian network is a procedure for calculating dialogue probability with respect to an uncertain chain of events. The Bayesian network is one probabilistic inference algorithm as an effective means for establishing intelligence information system and deduces a "cause" from the observed "result" when a cause-result complicated probability network exists.

The dialogue processing unit 162 updates the master frame stored in the master frame storage unit 38 in accordance with the group of slots supplied from the frame representation converter 36, and determines which operation is to be performed next as dialogue processing in accordance with the state of the updated master frame. In addition, the dialogue processing unit 162 stores the result of the dialogue processing in the dialogue history storage section 142 or the user profile storage section 143.

Figure 24:
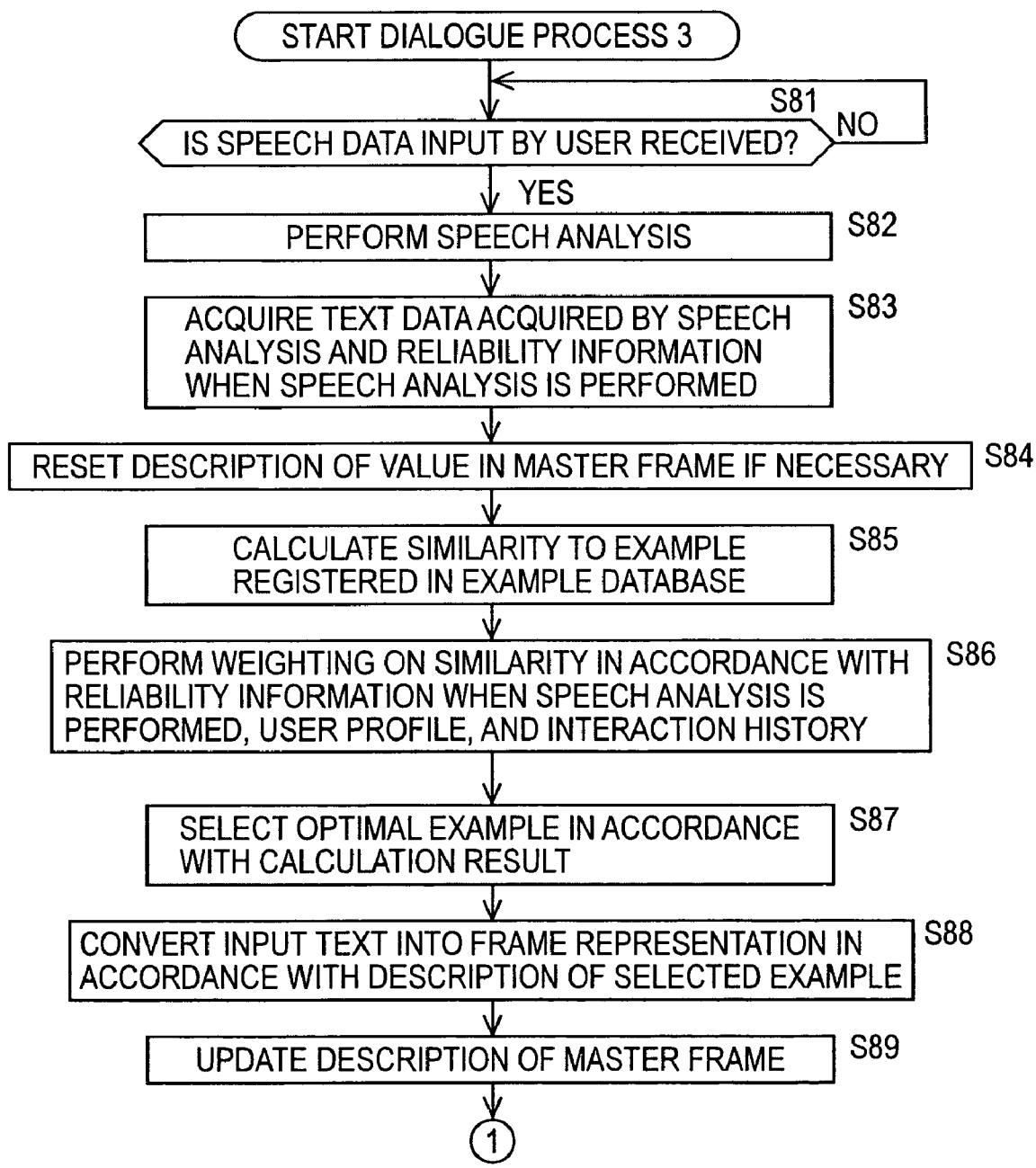
FIG. 24 is a flowchart of a third dialogue process.
Figure 25:
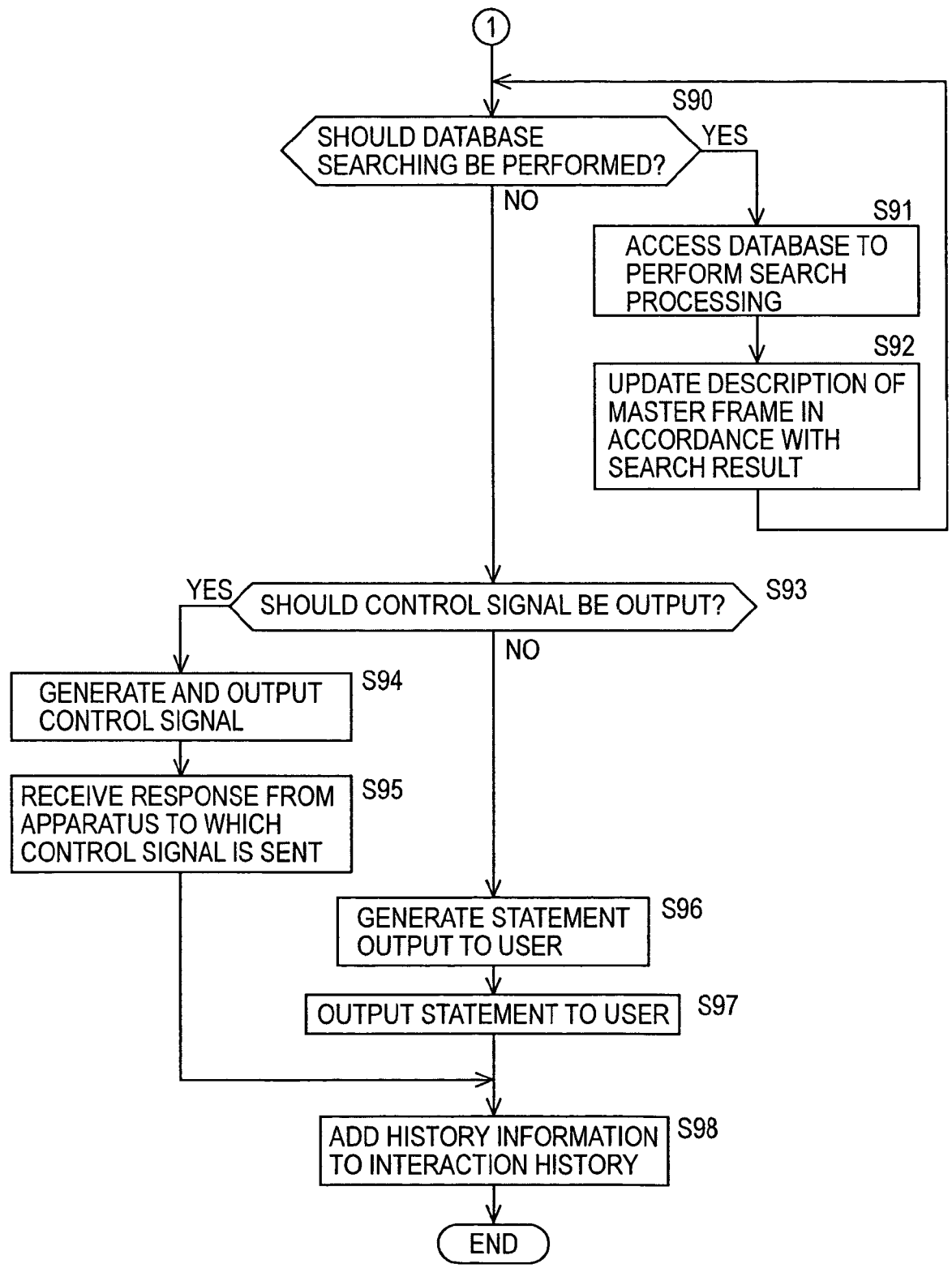
FIG. 25 is another flowchart of the third dialogue process.

Dialogue process 3 performed by the dialogue processing apparatus 131 shown in FIG. 22 is described next with reference to flowcharts shown in FIGS. 24 and 25.

Figure 20:
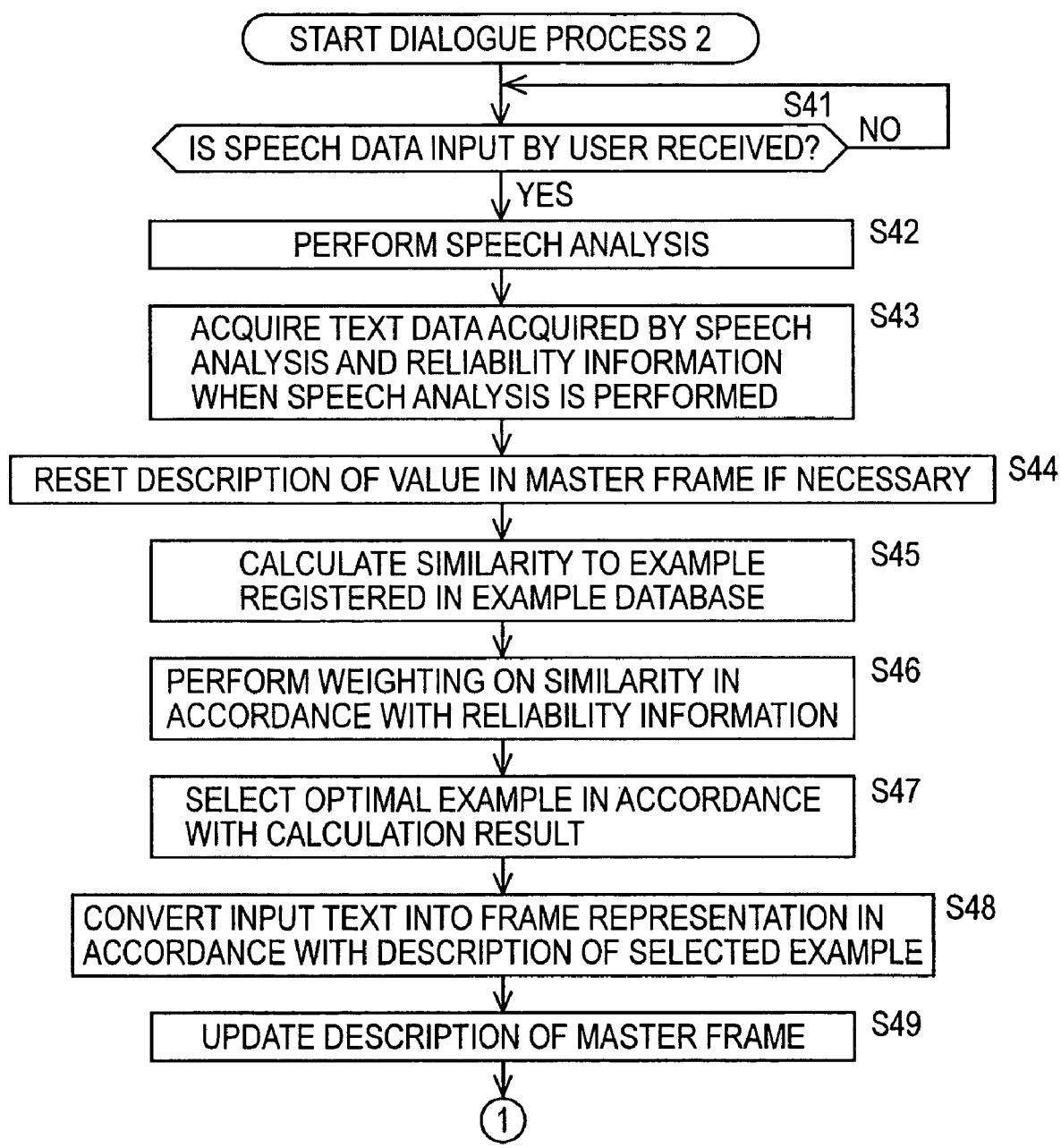
FIG. 20 is a flowchart of a second dialogue process.

In steps S81 to S85, processing basically similar to the processing in steps S41 to S45 in FIG. 20 is performed.

In other words, if it is determined that input speech data is received, speech analysis is performed to acquire a speech recognition result and reliability representing the certainty of the speech recognition result. Then, the dialogue controller 141 acquires the text data acquired by the speech analysis and the reliability information when the speech analysis is performed, and the description of a value in a master frame stored in the master frame storage unit 38 is reset if necessary. After dividing the input text in units of words, an input word string is generated by eliminating particles, and the similarity between the input word string and each example statement registered in the example database 33 is calculated by referring to a thesaurus stored in the thesaurus storage unit 34.

In step S86, the similarity calculator 161 performs weighting on the calculated similarity in accordance with the supplied reliability information, user profile, and dialogue history, and supplies the weighted similarity to the optimal example selector 35. More specifically, the similarity calculator 161 calculates the similarity between the input word string and each example statement, performs weighting on the similarity using the reliability of the speech recognition supplied from the speech processing section 72 if necessary. Then, if the current dialogue processing is performed almost immediately after the last dialogue processing in terms of time, the similarity calculator 161 refers to the dialogue history information stored in the dialogue history storage section 142, and calculates a correction value for similarity in accordance with the calculated similarity for the example statement in the last dialogue processing. In addition, the similarity calculator 161 refers to the user profile information stored in the user profile storage section 143. For example, if a user's behavior pattern exhibits a particular characteristic, similarity is calculated using a correction value for causing the similarity of a particular example statement to be high in accordance with the characteristic.

Figure 21:
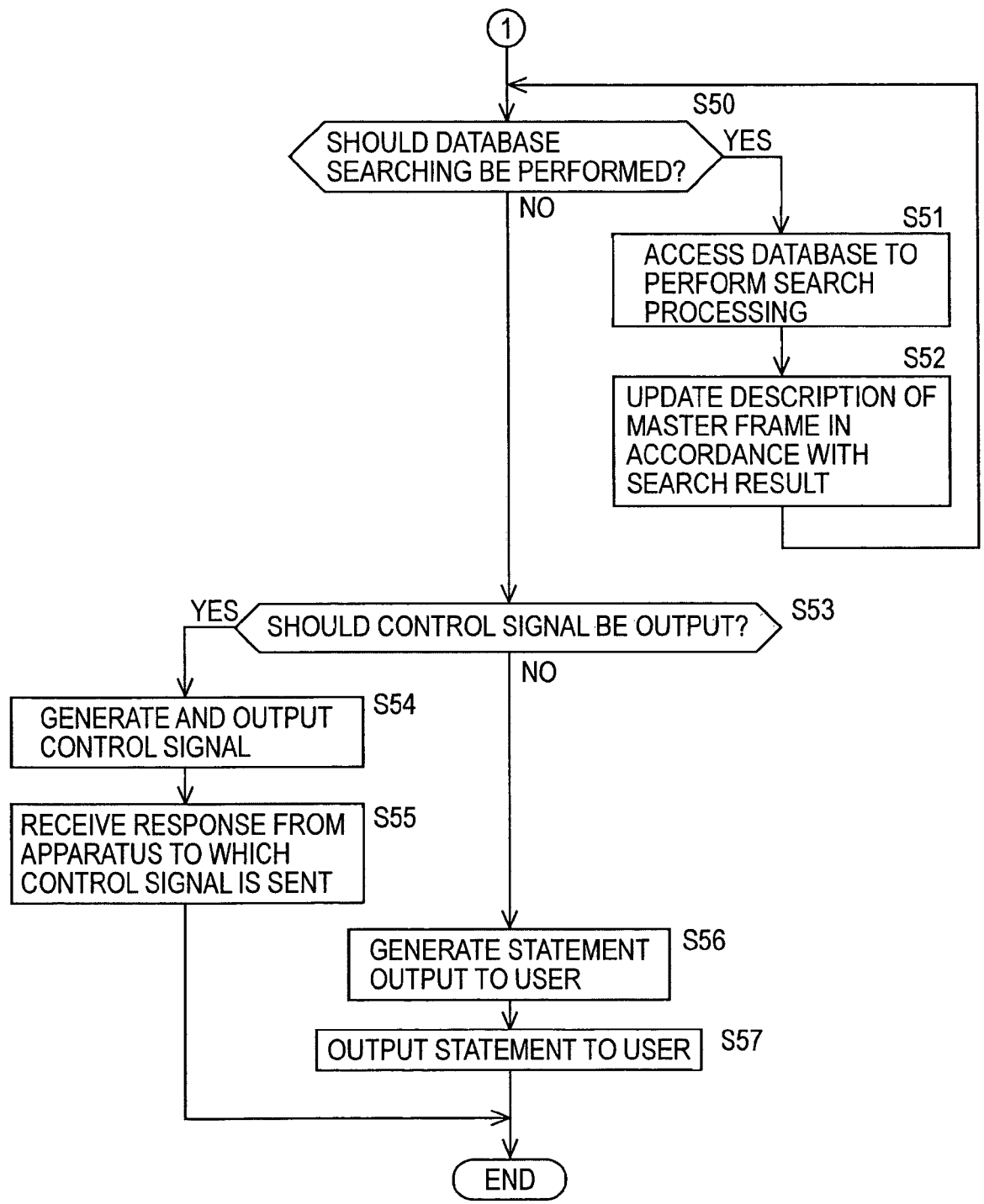
FIG. 21 is another flowchart of the second dialogue process.

In steps S87 to S97, processing similar to the processing in steps S47 to S57 in FIGS. 20 and 21 is performed.

In other words, an optimal example is selected from among examples registered in the example database 33 in accordance with a calculation result of weighted similarity, input text is converted into frame representation in accordance with the description of the selected example, that is, the optimal example, the description of the master frame is updated in accordance with a converted group of slots, and it is determined whether or not database searching should be performed in accordance with the state of the master frame. If it is determined that database searching should be performed, search processing is performed, desired information is acquired from a database, and the description of the master frame is updated such that the acquired information is put in a portion of the master frame corresponding to a target.

If it is determined that database searching need not be performed, it is determined whether or not a control signal should be output. If it is determined that a control signal should be output, a control signal for controlling processing of a predetermined external apparatus connected via the network interface 15 is generated. The generated control signal is sent to the apparatus via the network interface 15 and a network, and a response from the apparatus to which the control signal is output is received.

If it is determined that a control signal need not be output, an output statement to be presented to the user is generated using the template shown in FIG. 8, FIG. 9, FIG. 14, or FIG. 15. The generated output statement is output by displaying it as text or an image or by using speech.

After processing in step S95 or S97, the dialogue processing unit 162 adds history information in the current dialogue processing to the dialogue history stored in the dialogue history storage section 142, and supplies the dialogue processing result to the user profile storage section 143 if necessary. Then, the process ends.

Although a case where the speech data acquisition section 71 acquires speech data has been described, if the text data input section 11 receives text data input by the user, processing basically similar to the processing in step S1 performed by dialogue process 1 described with reference to FIG. 16 is performed instead of performing the processing in steps S81 to S83, and reliability information when speech analysis is performed is not used in step S86. (Weighting is performed on the similarity using only the user profile and the dialogue history.)

By the foregoing processing, the similarity between text input by the user or text acquired by speech recognition of user's speech and each example statement in frame representation is calculated, an optimal example is selected in accordance with the calculated similarity, a value in a slot in a master frame is updated, and dialogue processing is performed in accordance with the updated master frame. Thus, the user can acquire desired information and can give a desired operational instruction to a network apparatus by exchanging questions and answers without, for example, selecting a plurality of possible statements. In addition, since reliability information representing the certainty of a speech recognition result, dialogue history information of the user, or the user profile is used according to need in calculation of the similarity, the accuracy in dialogue processing is improved, and the processing robustness for input text including an error when a speech recognition result is used can be improved.

The dialogue processing performed by the dialogue processing apparatus according to any one of the foregoing embodiments of the present invention is capable of dealing with a wider variety of input text compared with a procedure for describing grammar and processing text input by users. In addition, in the dialogue processing performed by the dialogue processing apparatus according to any one of the foregoing embodiments of the present invention, information representing the certainty of speech recognition is used. Thus, the processing robustness for input text including an error when a speech recognition result is used can be improved compared with dialogue processing using known speech recognition. In addition, in the dialogue processing performed by the dialogue processing apparatus according to any one of the foregoing embodiments of the present invention, in order to configure a system, there is no need to describe technical grammar for causing the apparatus to interpret input text, and the complexity of operation when users who do not have linguistic knowledge establish a dialogue system for a new topic can be reduced.

In addition, for example, it is possible to incorporate the dialogue processing apparatus according to any one of the embodiments of the present invention into a robot apparatus so that a user can control the robot using the foregoing dialogue processing with natural language. In addition, the foregoing dialogue processing can be used not only as a user interface but also as an interface for internal processing, such as memory and emotion models stored in the robot.

The foregoing series of processing may also be performed by software. If the foregoing series of processing are performed by software, a program constituting the software is installed from a recording medium on a computer installed in dedicated hardware or, for example, a general-purpose personal computer that is capable of performing various functions by installing various programs.

Figure 26:
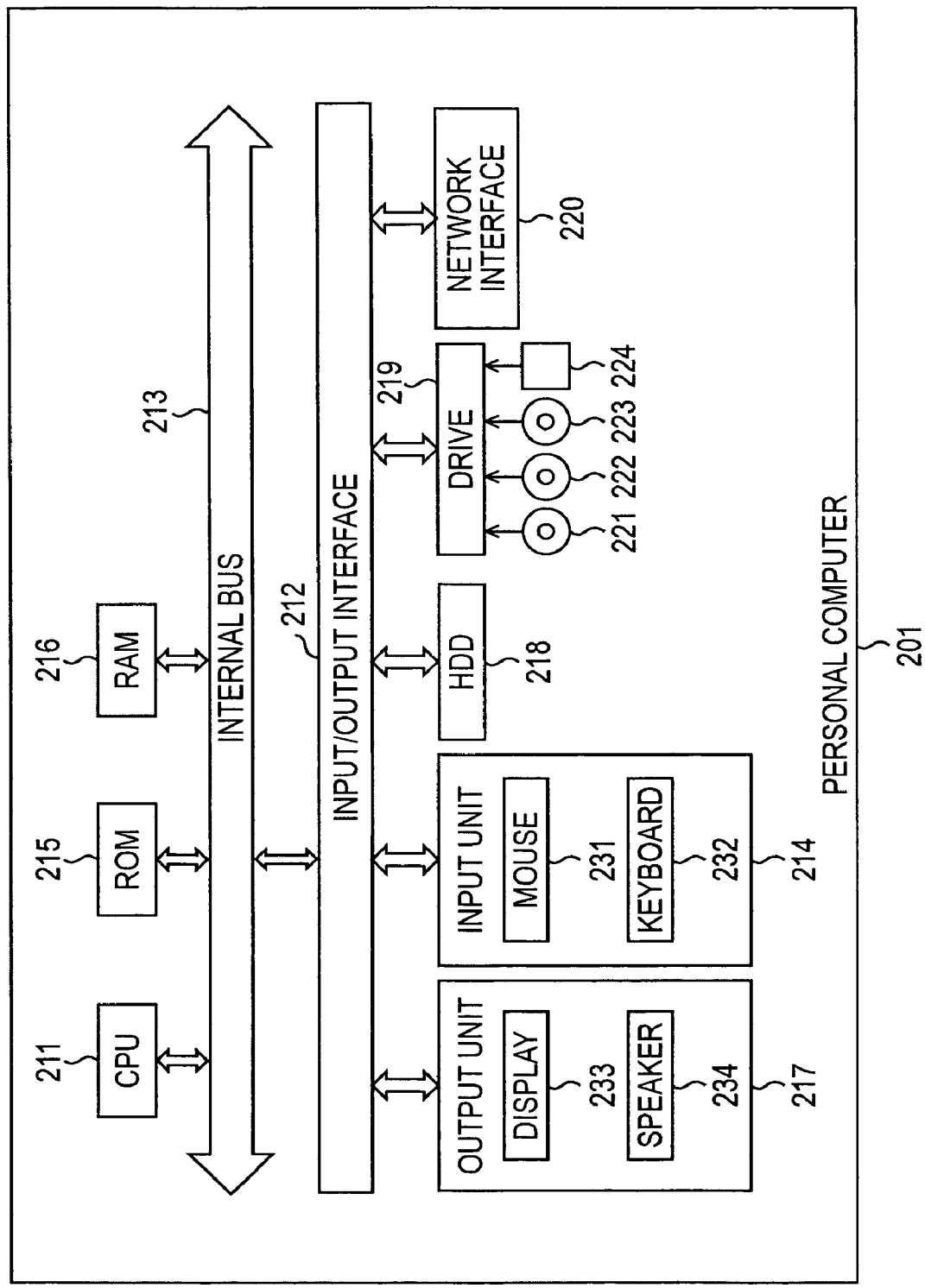
FIG. 26 is a block diagram showing the structure of a personal computer.

FIG. 26 is a personal computer 201 according to an embodiment of the present invention when the foregoing series of processing are performed by software.

A central processing unit (CPU) 211 of the personal computer 201 generally controls the operation of the personal computer 201. When receiving a user input from an input unit 214 including a mouse 231 and a keyboard 232 via an internal bus 213 and an input/output interface 212, the CPU 211 loads a program stored in a read-only memory (ROM) 215 to a random-access memory (RAM) 216 and performs the program. Alternatively, the CPU 211 loads a program installed in a hard disk drive (HDD) 218 to the RAM 216 to perform the program, and causes an output unit 217 including a display 233 and a speaker 234 to output the result of operation. In addition, the CPU 211 controls a network interface 220 to communicate with an external apparatus for data exchange.

In addition, if necessary, the CPU 211 is connected to a drive 219 via the internal bus 213 and the input/output interface 212, so that the CPU 211 can exchange information with a magnetic disk 221, an optical disk 222, a magneto-optical disk 223, or a semiconductor memory 224 connected to the drive 219 according to need.

As shown in FIG. 26, a recording medium on which the program is recorded not only includes a package medium, such as the magnetic disk 221 (including a flexible disk), the optical disk 222 (including a compact disk-read only memory (CD-ROM) and a digital versatile disk (DVD)), the magneto-optical disk 223 (including a MiniDisk (MD)), or the semiconductor memory 224, which records the program and is distributed in order to provide the program to a user independent of the computer, but also includes the ROM 215 or the HDD 218 which records the program and is built in the computer to be provided to the user.

In this specification, steps for a program recorded in the recording medium are not necessarily performed in chronological order in accordance with the written order. The steps may be performed in parallel or independently without being performed in chronological order.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus performing dialogue processing, comprising:
    acquisition means for acquiring text data described in a natural language,
    wherein the acquisition means includes:
        speech signal acquisition means for acquiring a speech signal from users' natural language spoken by the user; and
        speech processing means for analyzing the speech signal acquired by the speech signal acquisition means and outputting the text data corresponding to the speech signal,
        wherein the speech signal is an electronic signal;
    example storage means for storing a plurality of examples each including an example statement and frame information described using a frame format and corresponding to the example statement,
        wherein the frame format includes a plurality of slots representing semantic contents of the example statement;
    similarity calculation means for generating an input word string based on the text data acquired by the acquisition means, and for calculating a similarity between the input word string and the example statement stored by the example storage means,
        wherein the similarity calculation between the input word string and the example statement comprises weighting on the similarity in according with reliability representing a certainty of a speech recognition result, the reliability being an occurrence probability which is calculated using a state transition probability and an output symbol probability, and
        wherein the similarity calculation means performs the weighting on the similarity in accordance with user profile information of the user's personal information and normal behavior pattern stored in user profile storage means;
    example selection means for selecting an example corresponding to an example statement whose similarity to the text data acquired by the acquisition means is the highest from among the plurality of examples stored by the example storage means in accordance with the similarity calculated by the similarity calculation means;
    text data processing means for processing the text data acquired by the acquisition means to convert the text data into the frame format accordance with the frame information corresponding to the example selected by the example selection means; and
    dialogue processing means for performing the dialogue processing in accordance with the text data processed and converted into the frame format by the text data processing means,
    wherein the dialogue processing means puts information corresponding to a target of the acquired text data to be reported to the user in one of the plurality of slots included in the frame format for generating an output statement, and
    wherein the similarity calculation means uses the similarity for the example statement calculated in a last dialogue processing immediately preceding a current dialogue processing as a correction value or a value for the weighting.

2. The information processing apparatus according to claim 1, wherein:
    the speech processing means also acquires a reliability of the text data corresponding to the speech signal; and
    the similarity calculation means calculates the similarity also using the reliability.

3. The information processing apparatus according to claim 1, further comprising history storage means for storing a history of the dialogue processing performed by the dialogue processing means, wherein
    the similarity calculation means calculates the similarity also using the history stored by the history storage means.

4. The information processing apparatus according to claim 1, further comprising user information storage means for storing user information, wherein
the similarity calculation means calculates the similarity also using the user information stored by the user information storage means.

5. The information processing apparatus according to claim 1, further comprising searching means for searching for information stored in a predetermined database, wherein
the dialogue processing means controls the searching means to perform search processing necessary for the dialogue processing in accordance with the text data processed and converted into the frame format by the text data processing means.

6. The information processing apparatus according to claim 5, wherein the searching means generates a search formula and searches for the information stored in the predetermined database in accordance with the text data processed and converted into the frame format by the text data processing means.

7. The information processing apparatus according to claim 1, further comprising statement generation means for generating a statement to be reported to a user, wherein
the dialogue processing means controls the statement generation means to generate the statement necessary for the dialogue processing to be reported to the user in accordance with the text data processed and converted into the frame format by the text data processing means.

8. The information processing apparatus according to claim 7, wherein the statement generation means stores a template in advance, on which the statement is based.

9. The information processing apparatus according to claim 1, further comprising control signal generation means for generating a control signal for controlling an operation of an external apparatus connected via a network, wherein
the dialogue processing means controls the control signal generation means to generate the control signal for controlling the operation of the external apparatus connected via the network as a result of the dialogue processing in accordance with the text data processed to convert the text data into the frame format by the text data processing means.

10. An information processing method for an information processing apparatus performing dialogue processing, comprising the steps of:
controlling acquisition of text data described in a natural language, utilizing an acquisition unit,
wherein the controlling step includes the steps of:
acquiring a speech signal from users' natural language spoken by the user, utilizing a speech signal acquisition unit; and
analyzing the speech signal acquired in the step of acquiring speech signal and outputting the text data corresponding to the speech signal, utilizing a speech processing unit,
wherein the speech signal is an electronic signal;
generating an input word string based on the text data acquired by the acquisition unit, and calculating a similarity between the input word string and each of a plurality of examples each including an example statement and frame information described using a frame format and corresponding to the example statement, the plurality of examples being stored in a predetermined storage unit, utilizing a similarity calculation unit,
wherein the similarity calculation between the input word string and the example statement comprises weighting on the similarity in according with reliability representing a certainty of a speech recognition result, the reliability being an occurrence probability which is calculated using a state transition probability and an output symbol probability, and
wherein the weighting on the similarity is performed in accordance with user profile information of the user's personal information and normal behavior pattern stored in a user profile storage unit,
wherein the frame format includes a plurality of slots representing semantic contents of the example statement;
selecting an example corresponding to an example statement whose similarity to the text data, the acquisition of which is controlled by the acquisition controlling step, is the highest from among the plurality of examples stored in the predetermined storage unit in accordance with the similarity calculated by the calculating step, utilizing a example selection unit;
processing the text data, the acquisition of which is controlled by the acquisition controlling step, to convert the text data into the frame format n accordance with the frame information corresponding to the example selected by the selecting step, utilizing a text data processing unit; and
controlling the dialogue processing in accordance with the text data processed and converted into the frame format by the processing step, utilizing a dialogue processing unit,
wherein the dialogue processing unit puts information corresponding to a target of the acquired text data to be reported to the user in one of the plurality of slots included in the frame format for generating an output statement, and
wherein the similarity calculation unit uses the similarity for the example statement calculated in a last dialogue processing immediately preceding a current dialogue processing as a correction value or a value for the weighting.

11. A non-transitory computer-readable storage medium storing a computer program that when executed on a computer causes dialogue processing, the program comprising the steps of:
controlling acquisition of text data described in a natural language,
wherein the controlling step includes the steps of:
acquiring a speech signal from users' natural language spoken by the user; and
analyzing the speech signal acquired in the step of acquiring speech signal and outputting the text data corresponding to the speech signal,
wherein the speech signal is an electronic signal;
generating an input word string based on the text data;
calculating a similarity between the input word string and each of a plurality of examples each including an example statement and frame information described using a frame format and corresponding to the example statement, the plurality of examples being stored in a predetermined storage unit, utilizing a similarity calculation unit,
wherein the similarity calculation between the input word string and the example statement comprises weighting on the similarity in according with reliability representing a certainty of a speech recognition result, the reliability being an occurrence probability which is calculated using a state transition probability and an output symbol probability, and wherein the weighting on the similarity is performed in accordance with user profile information of the user's personal information and normal behavior pattern stored in a user profile storage unit, wherein the frame format includes a plurality of slots representing semantic contents of the example statement;

selecting an example corresponding to an example statement whose similarity to the text data, the acquisition of which is controlled by the acquisition controlling step, is the highest from among the plurality of examples stored in the predetermined storage unit in accordance with the similarity calculated by the calculating step;

processing the text data, the acquisition of which is controlled by the acquisition controlling step, to convert the text data into the frame format in accordance with the frame information corresponding to the example selected by the selecting step;

controlling the dialogue processing in accordance with the text data processed and converted into the frame format by the processing step; and putting information corresponding to a target of the acquired text data to be reported to the user in one of the plurality of slots included in the frame format for generating an output statement, wherein the similarity calculation unit uses the similarity for the example statement calculated in a last dialogue processing immediately preceding a current dialogue processing as a correction value or a value for the weighting.

12. An information processing apparatus performing dialogue processing, comprising:

a processor;

memory;

an acquisition unit acquiring text data described in a natural language, wherein the acquisition unit includes:
speech signal acquisition unit acquiring a speech signal from users' natural language spoken by the user; and
speech processing unit analyzing the speech signal acquired by the speech signal acquisition unit and outputting the text data corresponding to the speech signal,
wherein the speech signal is an electronic signal;

an example storage unit storing a plurality of examples each including an example statement and frame information described using a frame format and corresponding to the example statement,
wherein the frame format includes a plurality of slots representing semantic contents of the example statement;

a similarity calculation unit generating an input word string based on the text data acquired by the acquisition unit, and calculating a similarity between the input word string and the example statement stored by the example storage unit, wherein the similarity calculation between the input word string and the example statement comprises weighting on the similarity in according with reliability representing a certainty of a speech recognition result, the reliability being an occurrence probability which is calculated using a state transition probability and an output symbol probability, and wherein the similarity calculation unit performs the weighting on the similarity in accordance with user profile information of the user's personal information and normal behavior pattern stored in a user profile storage unit;

an example selection unit selecting an example corresponding to an example statement whose similarity to the text data acquired by the acquisition unit is the highest from among the plurality of examples stored by the example storage unit in accordance with the similarity calculated by the similarity calculation unit;

a text data processing unit processing the text data acquired by the acquisition unit to convert the text data into the frame format in accordance with the frame information corresponding to the example selected by the example selection unit; and a dialogue processing unit performing the dialogue processing in accordance with the text data processed and converted into the frame format by the text data processing unit, wherein the dialogue processing unit puts information corresponding to a target of the acquired teat data to be included in the frame format for generating an output statement, and wherein the similarity calculation unit uses the similarity for the example statement calculated in a last dialogue processing immediately preceding a current dialogue processing as a correction value or a value for the weighting.

* * * * *